US011762815B2

(12) United States Patent
Fritz et al.

(10) Patent No.: US 11,762,815 B2
(45) Date of Patent: Sep. 19, 2023

(54) MULTI-FRAMEWORK MANAGED BLOCKCHAIN SERVICE

(71) Applicant: Amazon Technologies, Inc., Seattle, WA (US)

(72) Inventors: Jonathan Andrew Fritz, Seattle, WA (US); Rahul Pathak, Mercer Island, WA (US); Anurag Windlass Gupta, Atherton, CA (US); Nachimuthu Govindasamy, Bothell, WA (US); Anthony A. Virtuoso, Hawthrone, NJ (US); Yugandhar Maram, Bellevue, WA (US); Mahmoud Salem, New York, NY (US); Carey Michael Crook, Seattle, WA (US); Turkay Mert Hocanin, New York, NY (US); Montana Norman Wong, Seattle, WA (US); Aditya Manohar, Sammamish, WA (US); Rajul Mittal, Seattle, WA (US); Shiyu Sun, Seattle, WA (US); Yu Yan, Seattle, WA (US); Ramkumar Kamalapuram Sugavanam, Bothell, WA (US); Gitesh Tyagi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 698 days.

(21) Appl. No.: 16/199,099

(22) Filed: Nov. 23, 2018

(65) Prior Publication Data
US 2020/0167319 A1    May 28, 2020

(51) Int. Cl.
*G06F 16/182* (2019.01)
*H04L 9/32* (2006.01)
(Continued)

(52) U.S. Cl.
CPC ...... *G06F 16/1834* (2019.01); *G06F 16/1824* (2019.01); *H04L 9/3263* (2013.01); *H04L 43/04* (2013.01); *H04L 9/50* (2022.05)

(58) Field of Classification Search
CPC ............. G06F 16/1834; G06F 16/1824; H04L 9/3263; H04L 43/04; H04L 2209/38
See application file for complete search history.

(56) References Cited

U.S. PATENT DOCUMENTS

| 9,306,949 B1 | 4/2016 | Richard et al. |
| 10,021,196 B1 | 7/2018 | Akers et al. |

(Continued)

FOREIGN PATENT DOCUMENTS

| CN | 107911421 | 4/2018 |
| CN | 108512935 | 9/2018 |

OTHER PUBLICATIONS

U.S. Appl. No. 16/199,100, filed Nov. 23, 2018, Jonathan Andrew Fritz et al.

(Continued)

*Primary Examiner* — Jensen Hu
(74) *Attorney, Agent, or Firm* — S. Scott Foster; Kowert, Hood, Munyon, Rankin & Goetzel, P.C.

(57) ABSTRACT

A multi-framework blockchain service may be implemented with a common interface to manage different types of blockchain networks. Requests to create a blockchain network may be received via an interface for the control plane that triggers the creation of the blockchain network according to an identified workflow. Various operations to change the blockchain network, including membership changes, node additions, governance changes, analytics changes, and monitoring changes may be allowed or denied by the control plane according to a distributed governance policy in effect for the blockchain network.

20 Claims, 16 Drawing Sheets

(51) Int. Cl.
*H04L 43/04* (2022.01)
*H04L 9/00* (2022.01)

(56) References Cited

U.S. PATENT DOCUMENTS

| | | | |
|---|---|---|---|
| 10,833,843 B1 * | 11/2020 | Vijayvergia | H04L 9/30 |
| 2010/0257276 A1 | 10/2010 | Savolainen | |
| 2016/0028552 A1 * | 1/2016 | Spanos | H04L 9/3236 |
| | | | 713/178 |
| 2016/0234162 A1 | 8/2016 | Sabet et al. | |
| 2018/0227275 A1 | 8/2018 | Russinovich et al. | |
| 2018/0260125 A1 * | 9/2018 | Botes | G06F 3/067 |
| 2018/0375869 A1 * | 12/2018 | Qiu | G06F 16/1805 |
| 2019/0018984 A1 * | 1/2019 | Setty | H04L 63/14 |
| 2019/0026821 A1 * | 1/2019 | Bathen | G06Q 40/00 |
| 2019/0166036 A1 | 5/2019 | Tappin et al. | |
| 2019/0205881 A1 * | 7/2019 | Borzilleri | G06Q 30/018 |
| 2019/0236559 A1 * | 8/2019 | Padmanabhan | G06F 21/64 |
| 2019/0268407 A1 * | 8/2019 | Zeng | H04L 9/0618 |
| 2020/0005292 A1 * | 1/2020 | Mao | H04L 9/3247 |
| 2020/0007312 A1 * | 1/2020 | Vouk | H04L 9/3239 |
| 2020/0120158 A1 * | 4/2020 | Nelluri | G06Q 10/063 |

OTHER PUBLICATIONS

Unknown, "What is Azure Blockchain Workbench?" Sep. 30, 2018, Retrieved from URL: https://docs.microsoft.com/en-us/azure/blockchain/workbench/overview, pp. 1-2.

Unknown, "IBM Blockchain Platform", Nov. 13, 2018, Retrieved from URL: https://console.bluemix.net/docs/services/blockchain/index.html#IBM-blockchain-platform, pp. 1-10.

* cited by examiner

MULTI-FRAMEWORK MANAGED BLOCKCHAIN SERVICE

BACKGROUND

Distributed applications are increasingly distributed beyond the boundaries of individually companies or entities but may instead rely upon a network of cooperating entities in order to operate. Blockchain networks have been developed to facilitate a transparent and consistent way to share and update data that can be examined and trusted by participants. Because blockchain networks involve complex consensus algorithms, storage requirements, and networking implementations, services that can remove the management burden of blockchain networks from participants so that participants can instead focus on application development are highly desirable.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of a multi-framework managed blockchain service are described herein. Different blockchain network frameworks offer different performance advantages according to the applications implemented using the blockchain shared in the blockchain network. Permissioned blockchain network frameworks may offer a high degree of trust as participants are invited in accordance with governance rules, in various embodiments, and may implement optimistic style features for proposing transactions to the blockchain. Permissionless blockchain network frameworks may offer a widely available blockchain network which can allow a distributed application to operate across a large number of different participants that can tolerate a lesser degree of trust than a permissioned blockchain network, making it easier to add or extent blockchain networks to incorporate new entities. Because deployment and management of diverse blockchain frameworks can be costly in terms of development time and resources, utilizing different blockchain service platforms for different applications can slow the pace of development of blockchain based applications. Moreover, advanced tooling, analytics features, and management features may vary from one platform to another, preventing the development of tools that can offer comparative assessments between blockchain frameworks.

Figure 1:
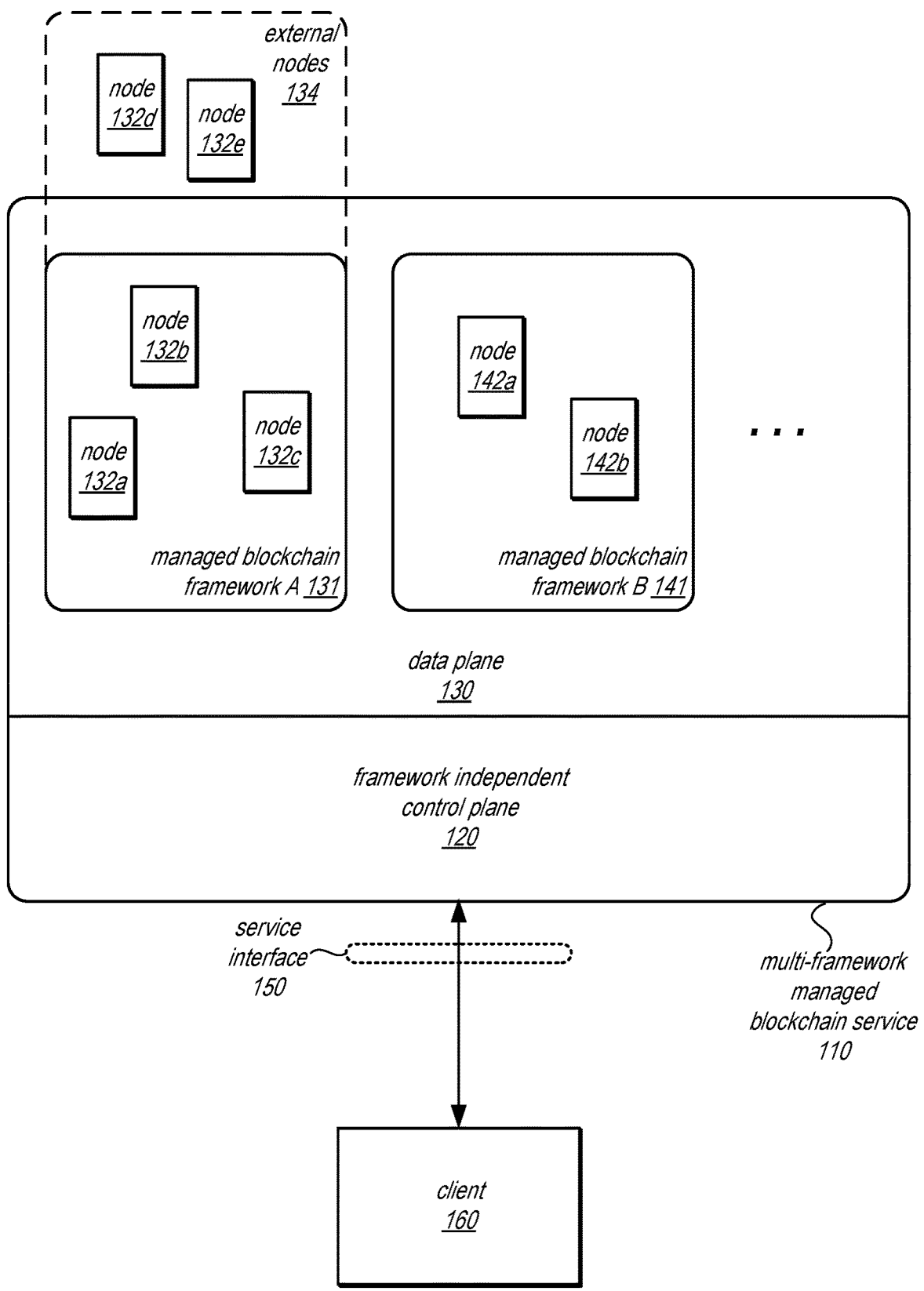
FIG. 1 illustrates a logical block diagram of a multi-framework managed blockchain service, according to some embodiments.

A multi-framework blockchain network service may remove development barriers by implementing a single interface for creating, operating, and managing different blockchains. In this way, management tools can be simplified, removing redundant implementations to operate the same feature on different blockchain service platforms. Moreover, the performance of blockchain networks may be improved as various management features may respond faster to problems or changes that need to be made to the blockchain network, instead of negotiating and coordinating responses and actions amongst various participants. FIG. 1 illustrates a logical block diagram of a multi-framework managed blockchain service, according to some embodiments. Multi-framework managed blockchain service 110 may implement a common service interface 150 and framework independent control plane 120, allowing clients, such as client 160 to manage multiple different blockchains, such as managed blockchain of framework type A 131 and managed blockchain of framework type B 141 in data plane 130. Moreover, data plane 130 may provide a hosting environment, separate from blockchain networks so that framework independent control plane 120, and not data plane 130, may perform the coordination and work to effect changes for blockchain networks, reducing performance impact on blockchain networks which would otherwise have to utilize host resources in data plane 130 to coordinate and execute blockchain management operations.

Various different management operations, as discussed in detail below with regard to FIGS. 4-11, may be invoked using a common interface. In this way, client applications can perform the same requests for different blockchain frameworks without having to redesign or implement separate applications for each framework. Different user accounts, identity tokens, or other credentials supplied by a client 160 when making a request for a managed blockchain network may allow framework independent control plane 120 to enforce control boundaries so that each entity operating node(s) in a managed blockchain network retains privacy and control over the entity's node(s), without ceding control to a single organizing or creating entity for the blockchain network.

Framework independent control plane 120 can manage the respective nodes of each blockchain in data plane 130, such as nodes 132a, 132b, 132c, 132d, and 132e, including externally hosted nodes 134 and nodes 142a and 142b, without implementing separate control mechanisms or data structures, reducing the cost to host different types different frameworks of blockchains within the service. For example, a common distributed governance feature can be implemented, as discussed below with regard to FIGS. 9 and 13, in order to enforce various distributed governance policies without integrating their enforcement directly within the blockchain network framework, allowing for reuse of policy languages or documents to be reused across different blockchain networks without being rewritten or coded for different blockchain networks. Similarly, common features such as monitoring, analytics, node management, membership management, or blockchain network management, also discussed below, provide examples of different control plane features that can reduce the burden of implementing separate applications to control the blockchain networks or access data produced as part of the operation of the blockchain network.

Please note that the previous description of a multi-framework managed blockchain service is a logical illustration and thus is not to be construed as limiting as to the implementation of clients, multi-framework blockchain services, interfaces, nodes or blockchain frameworks.

This specification begins with a general description of a provider network that implements a multi-framework managed blockchain service. Then various examples of the multi-framework managed blockchain service (along with other services that may be utilized or implemented) including different components/modules, or arrangements of components/module that may be employed as part of implementing the services are discussed. A number of different methods and techniques to implement a multi-framework managed blockchain service are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
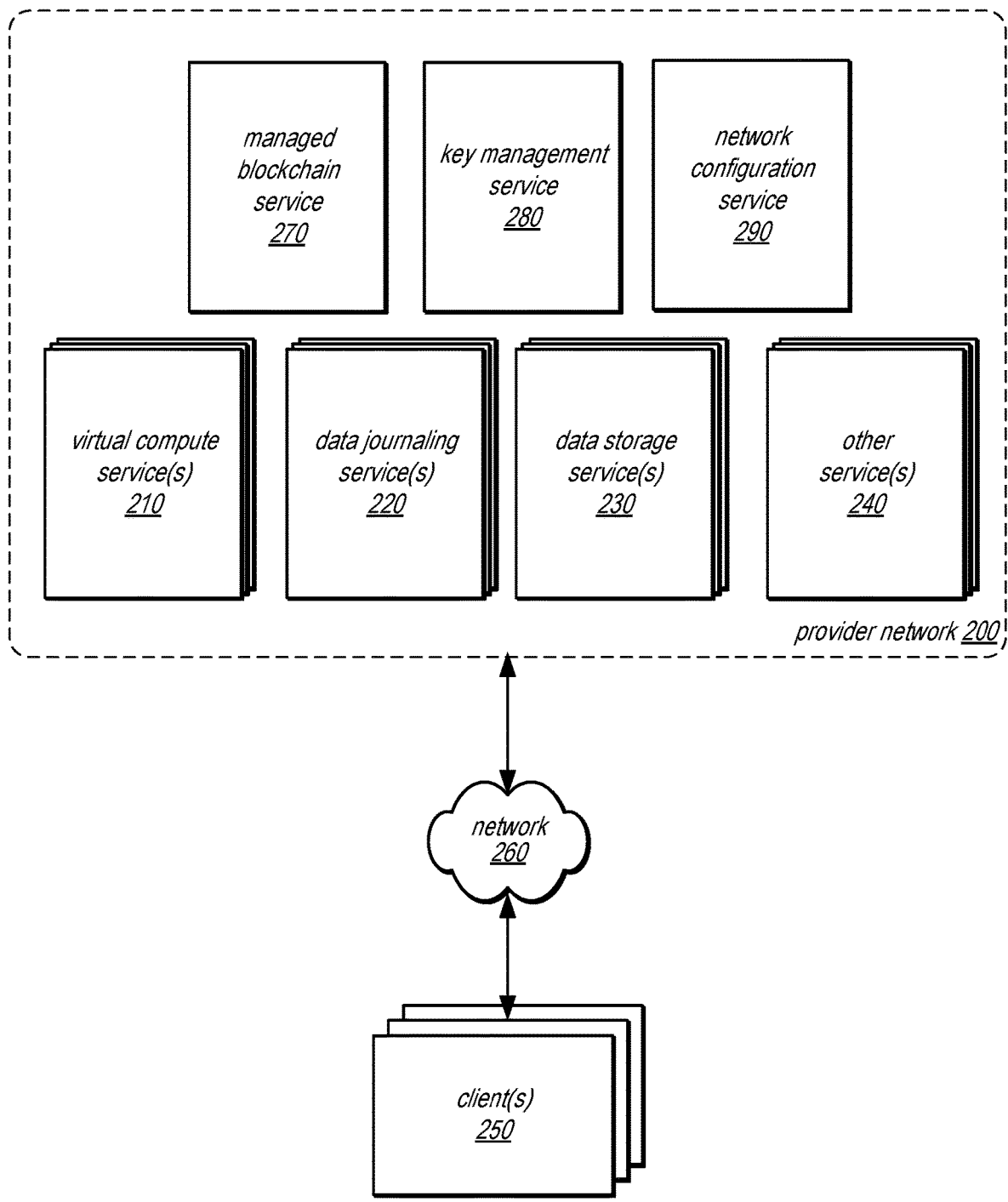
FIG. 2 is a logical block diagram illustrating a multi-framework managed blockchain service in a provider network, according to some embodiments.

FIG. 2 is a logical block diagram illustrating a multi-framework managed blockchain service in a provider network, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 16), needed to implement and distribute the infrastructure and storage services offered by the provider network 200.

In some embodiments, provider network 200 may implement various computing resources or services, such as a virtual compute service(s) 210, data journaling service(s) 220, (e.g.), data storage service(s) 230, (e.g., relational or non-relational (NoSQL) database query engines, map reduce processing, data flow processing, and/or other large scale data processing techniques, an object storage service, block-based storage service, or data storage service that may store different types of data for centralized access), other services 240 (any other type of network based services (which may include various other types of storage, processing, analysis, communication, event handling, visualization, and security services not illustrated), managed blockchain service 270, key management service 280, and network configuration service 290

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 16 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service(s) 210 may be implemented by provider network 200, in some embodiments. Virtual compute service(s) 210 may offer software container or other operating system virtualized services, such as Docker containers, in some embodiments. In some embodiments, virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 250 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc . . . and (in the case of reserved compute instances) reservation term length.

Data journaling service(s) 220, may include log-based storage and query support databases, data streaming services, or other data storage and processing services that may implement an ordered commit log for storing journal (e.g., log) entries. For example, data journaling service(s) 220 may include may provide strong consistency guarantees and support constraints between committed records, to enable features like deduplication, sequencing, and read-write conflict detection. A log of entries in data journaling service(s) 250 may be used to determine whether or not to commit transactions to a blockchain (e.g., write requests and other modifications) in order to allow to see if a proposed transaction conflicts with other committed transactions. data journaling service(s) 220 may maintain a separate log or chain of log records for blockchain network (or portion of a blockchain network, such as a log maintained per channel of a blockchain), serving as an authoritative definition of the changes to the blockchain over time.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 230 may be a data warehouse service that utilizes a centralized data store implemented as part of another data storage service 230. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed blockchain service 270, as discussed below in more detail with regard to FIGS. 3-11, may manage the creation and operation of blockchain networks of different frameworks through a common control plane and interface (e.g., API). Key management service 280 may provide centralized encryption key management service to create, import, and rotate encryption keys for encrypting data. Network configuration service 290 may implement various networking features, such as virtual network endpoints, logically isolated networks (e.g., virtual private clouds), network traffic controls, etc.

Generally speaking, clients 250 may encompass any type of client configurable to submit network-based requests to provider network 200 via network 260, including requests for storage services (e.g., a request to create, read, write, obtain, or modify data in data storage service(s) 230, etc.) or managed blockchain service 270 (e.g., a request to create a blockchain network). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment.

Clients 250 may convey network-based services requests (e.g., queries or other access requests directed to data in data storage service(s) 230, operations, tasks, or jobs) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
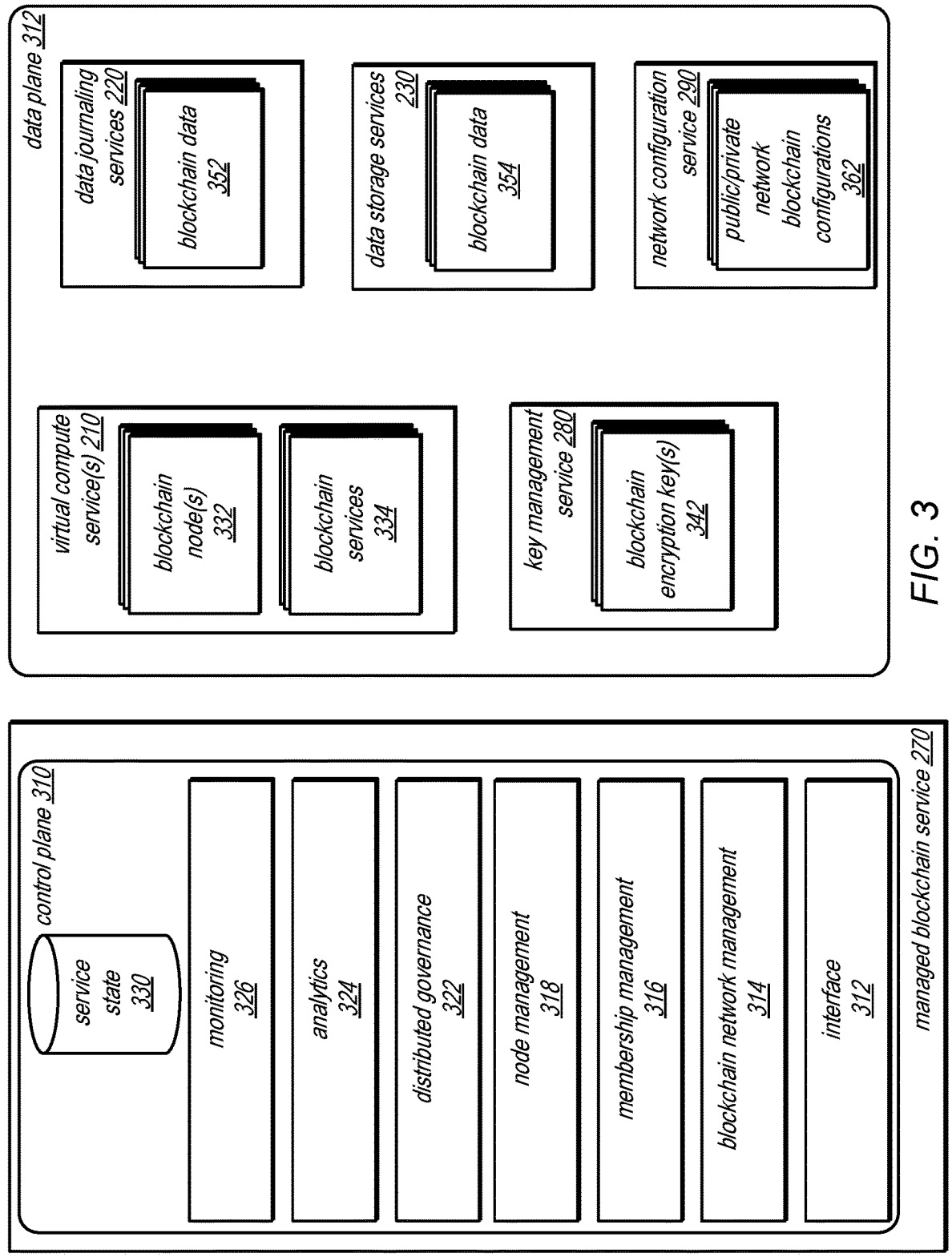
FIG. 3 is a logical block diagram illustrating a managed blockchain service, according to some embodiments.

FIG. 3 is a logical block diagram illustrating a managed blockchain service, according to some embodiments. Managed blockchain service 270 may implement control plane 310, which may be framework independent as discussed above with regard to FIG. 1. Control plane 310 may include various features to handle the creation, operation, and end of a blockchain network. Control plane 310 may include interface 312. Interface 312 may provide a programmatic interface (e.g., Application Programming Interfaces (APIs)), graphical user interface (GUI) (e.g., as a service console for administrators), and/or command line interface for various requests and interactions with different control plane features as discussed below with regard to FIGS. 4-11.

Various features, discussed in detail below may include, blockchain network management 314, which handles blockchain network creation among other requests. For example, a user account of the provider network may submit a request to create a blockchain to be hosted by managed blockchain service 270. The request may specify a blockchain framework, as well as various other blockchain features, including networking features such as whether public network traffic may be allowed, governance features, such as distributed governance policy for adding nodes or members to the blockchain network, among others. Blockchain network management 324 may determine a workflow to identify the nodes or services to deploy, such as blockchain nodes 332 and blockchain services 334 in virtual compute service(s) 210.

Control plane 310 may include membership management 316, which handles membership invitations, among other requests. For example, in order for an entity (e.g., another provider network user account, an external entity, etc.) to be allowed to be a participant in a blockchain network, the entity may be granted membership. Membership management 316 may implement features to send invitations to entities for membership, check whether such invitations are allowed according to a distributed governance policy for the blockchain system, and handle invitation acceptances (or rejections). Membership management 316 may also provide access to membership lists or identify for a user account which blockchain networks the user account is a member of.

Control plane 310 may include node management 318, which handles node creation, among other requests. For example, entities associated with different user accounts may create, modify, or remove nodes from blockchain networks of which they are a member via different requests handled by node management 318.

Control plane 310 may include distributed governance 322, which handles policy evaluations for modifications to a blockchain network, among other requests. For example, distributed governance policies may be implemented to govern actions taken with respect to a blockchain network. A distributed governance policy may describe criteria, including approval/disapproval mechanisms like a voting system, for determining whether a proposed change (e.g., to add a member, node, evict a member or node, to modify blockchain network configuration, hardware, and/or software, a change to a distributed governance policy, etc.). Distributed governance 322 may evaluate a received proposal in order to determine whether the proposal may be allowed. Distributed governance 322 may initiate a vote, sending vote notifications, evaluating received votes, and approving/finalizing vote results in order to evaluate a proposal.

Control plane 310 may include analytics 324, which handles requests to access offline blockchain data, among others. For example, blockchain data (including metadata describing the blockchain, data related to or linked to the blockchain, such as files or other content referenced by the blockchain, and blockchain transactions) may be copied from storage for the blockchain network to another data storage service for performing various analytics operations, including queries and machine learning or other statistical analysis. Analytics feature 324 may manage offline data collection and visibility, allowing individual user accounts to enable or disable data collection, among other configuration options.

Control plane 310 may include monitoring 326, which may monitor for and respond to performance events, in some embodiments. For example, monitoring feature 326 may performed automated management tasks for managed blockchain service 270 according to detected performance events. Performance data may be collected and evaluated with respect to different event criteria in order to determine whether a performance event is triggered. Monitoring feature 326 may determine and/or initiate responsive actions to detected event, including actions to add, remove, or replace nodes within a blockchain network, increase or decrease service resources (e.g., increase or decrease orderer nodes), or modify blockchain network configuration or other features to respond to detected performance events.

Control plane 310 may also maintain various information as service state 330, which may be implemented as one or many data stores (e.g., different types and styles of databases, or one large data store, such as a large document database for storing service state including blockchain networks state). In this way, the progress of workflows, state or membership of blockchain networks, mapping information or other configuration information, among other data used to implement managed blockchain service 270 can be reliably and accessibly maintained.

Managed blockchain service 270 may control and operate various features in data plane 312. Some or all of data plane 312 may be implemented directly within management blockchain service 270 (not illustrated), in some embodiments. In other embodiments, other provider network services may provide resources that operate in the data plane 312 of managed blockchain service 270. For example, virtual compute service(s) 210 may implement both blockchain node(s) 332 and service(s) 334, data journaling services 220 may implement blockchain data storage 352 (e.g., as an ordered commit log backend for a blockchain), data storage services 230 for tiered or offline blockchain data 354 storage, network configuration service 290 for public/private network blockchain configurations 362, and key management service 280 for blockchain encryption key(s) 342 for encryption and identity.

Figure 4:
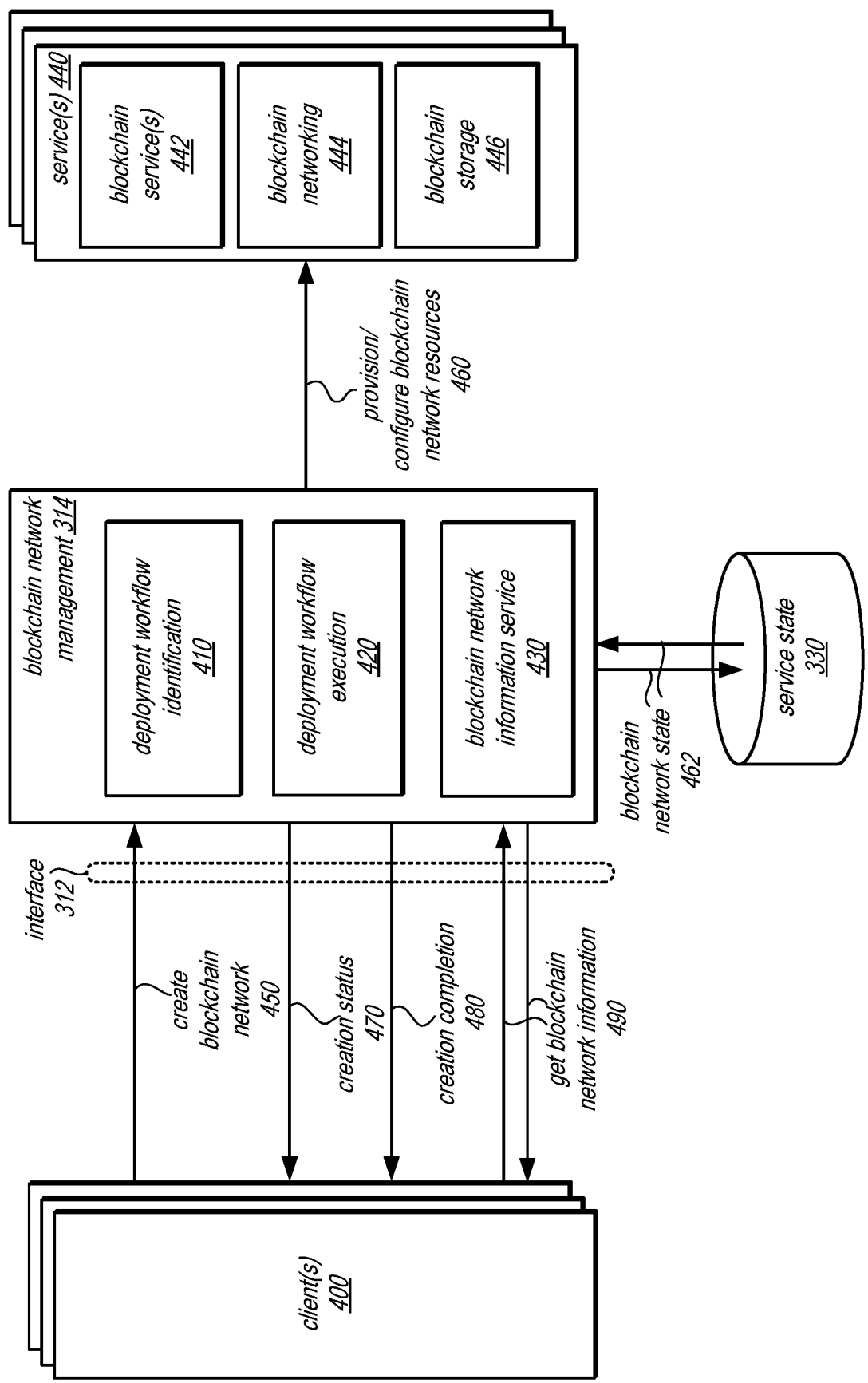
FIG. 4 is a logical block diagram illustrating interactions with a blockchain network management feature of a control plane of a managed blockchain service, according to some embodiments.

FIG. 4 is a logical block diagram illustrating interactions with a blockchain network management feature of a control plane of a managed blockchain service, according to some embodiments. Client(s) 400 may be external clients (e.g., 250 in FIG. 2) or internal clients of a provider network 200 that are implemented as applications on other services, such as virtual computing service(s) 210. Client(s) 400 may submit requests to create a blockchain network via interface 312 to blockchain network management 314. A blockchain creation request 450 may specify one of the offered blockchain frameworks of managed blockchain service 270. Additionally, other features may also be specified alone or in various combinations, such as a name, description, selection of governance rules, initial member, subsequent members, nodes, framework specific configuration information (e.g., specify which orderer service backend to use for a permissioned blockchain network framework), etc. Creation request 450 could submit performance criteria, number of expected members, network configuration or other blockchain network configuration information, in addition to the framework. In some embodiments, blockchain network management 314 may implement a framework recommendation engine (not illustrated) which could recommend or select a blockchain network framework that satisfies the performance criteria (e.g., using rules-based selection, like decision trees). While creation of a blockchain may temporarily grant a creating account sole authority over the blockchain network, distributed governance policies may transfer the control of the network to or among multiple other members in addition to or instead of the account that submitted creation request 450.

Blockchain network management may implement deployment workflow identification 410 to evaluate the specified blockchain network configuration information in order to identify a deployment workflow (or multiple workflows) to achieve the specified blockchain network. For example, deployment workflow identification may identify a workflow (or set of workflows) for a specified blockchain framework, and then may select among various options or versions of that blockchain framework type that would satisfy the other features of the blockchain network specified in the request For instance, blockchain service resources may be deployed on larger and faster host systems if the blockchain system is expected to have high throughput. Configuration errors in request 450 may result in error indications (not illustrated) which may be identified at deployment workflow identification 410, in some embodiments.

Once identified, deployment workflow execution 420 may perform the identified workflow(s). For example, deployment workflow execution may send one or multiple requests 460 to other services 440 of provider network 200 to provision and configure blockchain service(s) 442 (e.g., orderer service, orderer service backend, backup configuration, monitoring configuration), blockchain networking 444 (e.g., to enable logically isolated networks, private networks, firewalls, access control lists, routing tables or other networking features to configure a network in which to host the blockchain network), and blockchain storage 446 (e.g., which may configure data stores for analytics information, orderer backend storage, etc.). Deployment workflow execution 420 may, in some embodiments, select from a pool of previously allocated (and configured) resources to assemble some (or all) of a blockchain network (e.g., a pool of preconfigured instances that implement orders or certificate authorities). Deployment workflow execution 420 may interact with other services not illustrated, such as network configuration service 290 to provision or configure a virtual private network for a blockchain, for instance, that could be updated to include the nodes created for different user accounts in the same virtual private network, in some embodiments.

During the performance of the creation workflow, blockchain network management 314 may provide creation status indications 470 (e.g., "in progress" "X % complete", etc.). When finished, blockchain network management 314 may update service state 330 with the appropriate blockchain network state 462 to record the existence and configuration of the blockchain network. Blockchain network management 314 may provide a completion indication 480, in some embodiments.

In some embodiments, blockchain network management 314 may implement blockchain network information service 430 to handle requests to get 490 various blockchain network information. For example, a request 490 to identify configuration parameters, including a blockchain network framework, number of nodes, number of members, or other blockchain network information, may be serviced by blockchain information service 430 retrieving blockchain network state 462 from service state 330.

Figure 5:
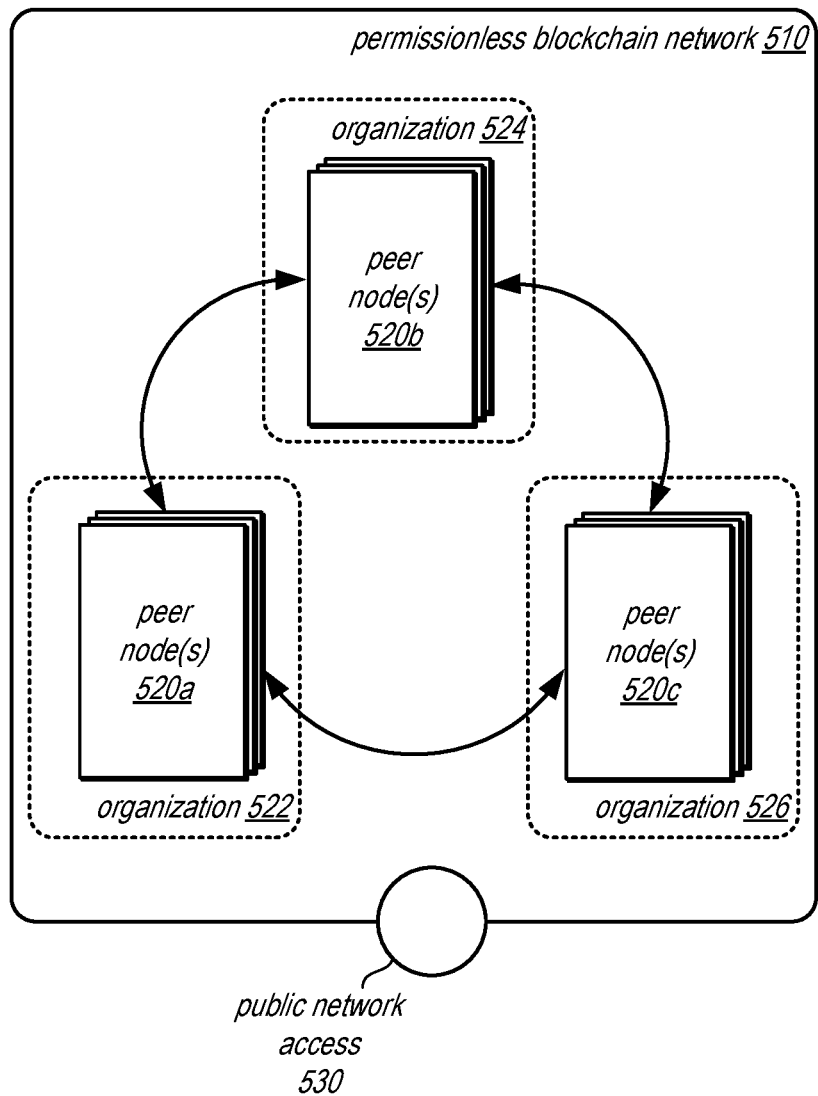
FIG. 5 is a logical block diagram illustrating a permissionless blockchain network framework, according to some embodiments.

FIG. 5 is a logical block diagram illustrating a permissionless blockchain network framework, according to some embodiments. Permissionless blockchain networks 510, such as Ethereum, may utilize peer node(s) in one or more organizations, such as peer nodes 520a, 520b, and 520c in organizations 522, 524, and 526 respectively. In such blockchain frameworks, peer nodes 520 may perform the various operations to propose transactions, order transactions, and validate transactions. Because the blockchain network 510 is permission, in some scenarios public network access 530 (e.g., to the Internet) may be provided or configured in order to allow external nodes operating on the same blockchain framework to participate in the blockchain network 510. However, in other scenarios, the permissionless blockchain network 510 may remain in a private network without public network access.

Application nodes (not illustrated) may access peer node(s) 520 in order to perform various operations to implement a distributed application using one or more Application Programming Interfaces (APIs) implemented for the blockchain network framework. For example, an application node may submit an update to a record processed by an entity that implements application node (e.g., a government agency that provides a government issued identifier or serial number for a product that is being manufactured by another entity). In some embodiments, application nodes may be implemented on a same server or host as the peer node(s) 520 (not illustrated).

Figure 6:
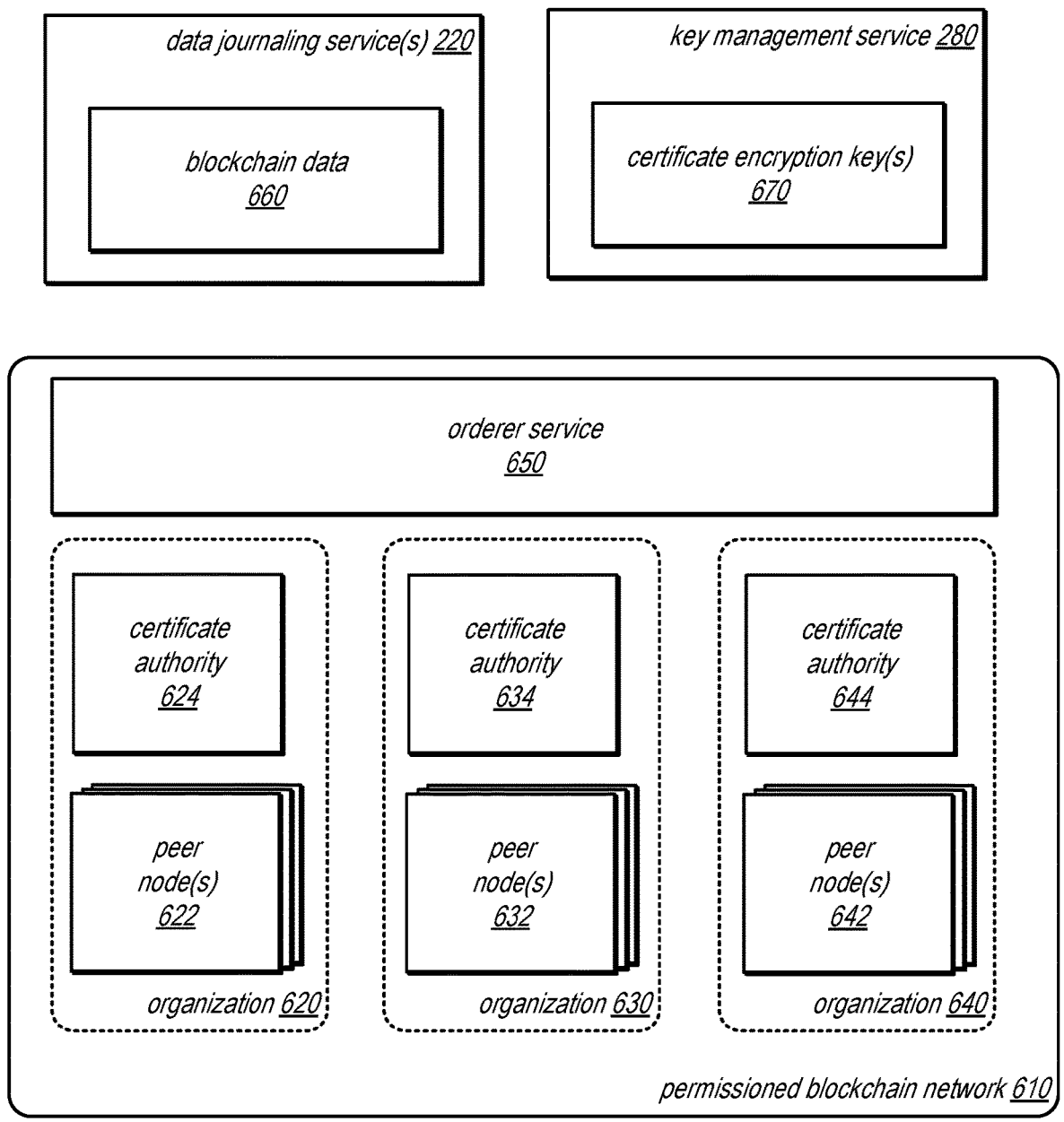
FIG. 6 is a logical block diagram illustrating a permissioned blockchain network framework, according to some embodiments.

FIG. 6 is a logical block diagram illustrating a permissioned blockchain network framework, according to some embodiments. Permissioned blockchain network 610, such as Hyperledger Fabric, allow multiple different organizations that are members of a blockchain network to be setup, like organizations 620, 630, and 640. These organizations may implement one or multiple peer nodes, such as peer node(s) 622, 632, and 642, to execute smart contracts and other blockchain operations. Peer node(s) may make use of an orderer service 650. In some embodiments, an orderer service may be separately allocated service nodes that implement an orderer service for transactions proposed to the blockchain network. In one embodiment, orderer service 650 be a multi-tenant orderer service that receives proposed transactions via a network endpoint for the service from peer node(s) from different organizations and/or blockchain networks.

In some embodiments, orderer service 650 may incorporate a backed commit log service, such as Apache Kafka, in order to provide a commit log for ordered transactions. In other embodiments, orderer service 650 may rely upon another provider network service, which may be a data journal service 220 that can also provide an ordered commit log stored as blockchain data 660 for verifying and committing transactions to the blockchain network. Using an external service may also allow for tiered blockchain data storage. If, for instance, an orderer failed and a new orderer was launched, the orderer may only have to retrieve a set of data maintained in data journaling service that is small (as a result of moving out older blockchain data to other storage service(s) 230, such as an object store and/or another type of database), in some embodiments, significantly reducing recovery time from failures or launching additional orderers.

In some embodiments, organizations may implement certificate authorities to grant certificates to peer nodes in order to sign communications to be trusted within the blockchain network. Certificate authorities, such as certificate authority 624, 634, and 636 could rely upon a stored certificate at the certificate authority in some embodiments to provide other certificates to peer node(s) 622. These certificates that are stored on the certificate authorities could be stored using a hardware security module (HSM) device in a host system. Alternatively, certificate authorities could utilize an encryption key for certificates 670 provided by key management service 280 to decrypt the certificate for providing the other certificates and then discard the decrypted form when finished so as to not store the decrypted version of the certificate.

Application nodes (not illustrated) may access peer node(s) 522, 532, and 542 respectively in order to perform various operations to implement a distributed application using one or more Application Programming Interfaces (APIs) implemented for the blockchain network framework. As noted above, in some embodiments, application nodes may be implemented on a same server or host as the peer node(s) 522, 532, or 542 while in other embodiments application nodes may be implemented on separate servers, including servers implemented as part of separate networks or services within provider network 200 or external to provider network 200.

Figure 7:
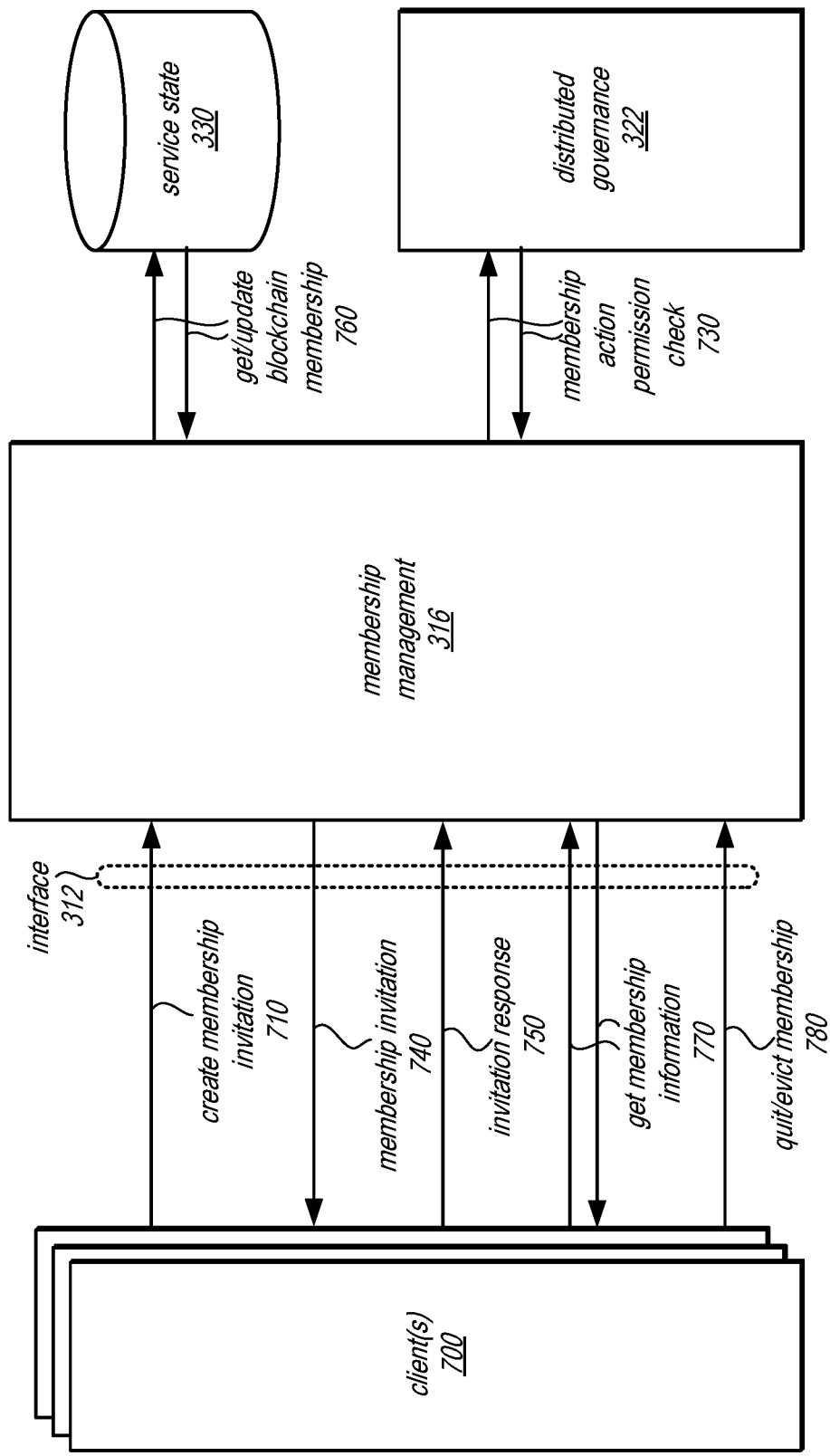
FIG. 7 is a logical block diagram illustrating interactions with a membership management feature of a control plane of a managed blockchain service, according to some embodiments.

FIG. 7 is a logical block diagram illustrating interactions with a membership management feature of a control plane of a managed blockchain service, according to some embodiments. Client(s) 700 may be external clients (e.g., 250 in FIG. 2) or internal clients of a provider network 200 that are implemented as applications on other services, such as virtual computing service(s) 210. Client(s) 700 may submit requests to create a membership invitation 710 via interface 312 at membership management 316. Membership management 316 may perform a permission check 730 by querying distributed governance 322 to verify that the membership invitation can be made. A vote or other proposal evaluation technique may be performed, as discussed below with regard to FIGS. 9 and 13, in some embodiments. In some scenarios, the request 710 may be associated with a user (e.g., a super user) that can invite as many members as desired (or as part of an initial blockchain creation workflow) and so may avoid a membership action permission check (or the check may be performed without employing a vote but be instead resolved by applying a distributed governance provision that specifies the user's ability to invite members).

If allowed, membership management 316 may send a membership invitation 740 to a client associated with the invited member (e.g., as API messages, console notifications, emails, etc.). The membership invitation 740 may include information to setup or enable a node, either internally hosted by managed blockchain network or externally hosted, as discussed above with regard to FIG. 1. For example, an orderer service endpoint or network address may be provided to configure peer nodes as discussed above with regard to FIG. 6. The invitation response 750 may be received at membership management 316. If accepted, membership management may initiate operations to provision resources and enable access (e.g., network access) for the new member (not illustrated) and update blockchain membership 760 in service state 330.

Client(s) 700 may also submit a request for membership information 770 (e.g., to identify memberships with various blockchain networks for a user account, other members not operated or controlled by the requesting user account, etc.). Membership management 316 may get the requested membership information 760 from service state 330. In some embodiments, access to some membership information may be restricted and thus membership management 316 may perform permission checks 730 to accept or deny information requests or use an access control list.

Client(s) 700 may submit a request to quit membership in a blockchain network 780 or propose an eviction. Either of these requests may provoke a membership action permission check 730. If performed, updates 760 to blockchain membership may be made.

Figure 8:
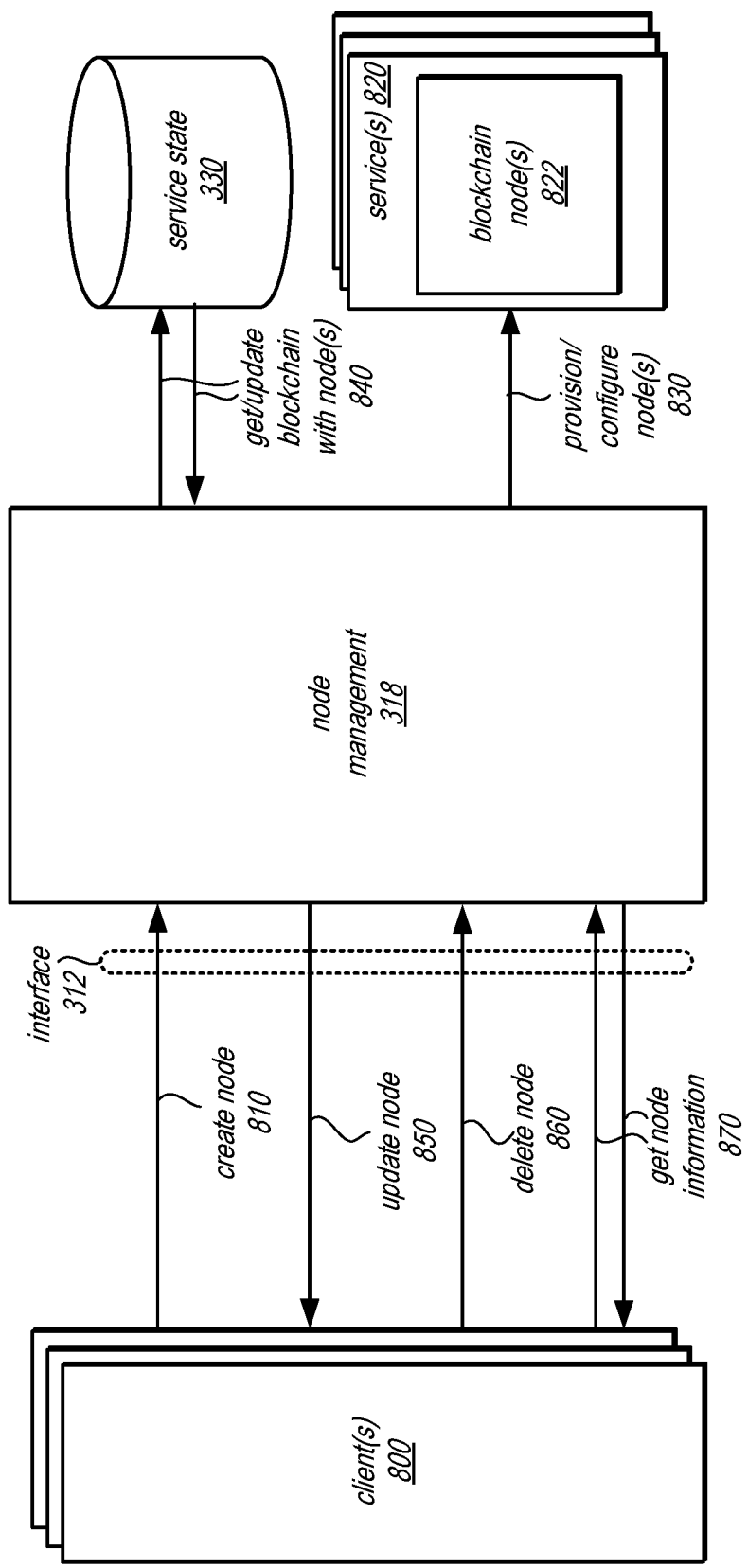
FIG. 8 is a logical block diagram illustrating interactions with a node management feature of a control plane of a managed blockchain service, according to some embodiments.

FIG. 8 is a logical block diagram illustrating interactions with a node management feature of a control plane of a managed blockchain service, according to some embodiments. Client(s) 800 may be external clients (e.g., 250 in FIG. 2) or internal clients of a provider network 200 that are implemented as applications on other services, such as virtual computing service(s) 210. Client(s) 800 may submit a request to create a node 810 associated with a member of a blockchain network via interface 312. The creation request 810 may specify a type of node (e.g., hardware or other performance capabilities) and/or configuration (e.g., type of virtualization platform, operating system, application to launch/install, etc.). Node management 318 may parse the request and perform the appropriate requests to provision the node 830 at the appropriate service(s) 820, such as blockchain node(s) 822. Node management 318 may also update service state 330 to update 840 blockchain network information to reflect the created node(s).

Similarly, update node requests 850 (e.g., to change node configuration, change node size or resource allocation, etc.) may be sent via interface 312. Node management 318 may perform similar configuration operations 830 to blockchain node(s) 822, including instructing a management agent (not illustrated) to perform one or more operations to effect the update, in some embodiments. Updates to service state 840 to indicate the updates to the nodes of the blockchain network may be made.

Similarly, delete node requests 860 to stop, halt, or otherwise remove a node may be sent via interface 312. Node management 318 may perform similar configuration operations 830 to blockchain node(s) 822, including instructing a management agent (not illustrated) to stop performance and or a request to service(s) 820 to shut down one of blockchain node(s) 822. Again, updates to service state 840 to indicate the updates to the nodes of the blockchain network may be made.

Node management 318 may also handle requests to describe nodes, like get node information request 870. Node management 318 may retrieve configuration information of the node 840 from service state and use the retrieved information to return a result to request 870. Performance metrics or other health information (discussed below with regard to FIGS. 11 and 15) could be combined or included with node information, in some embodiments.

Figure 9:
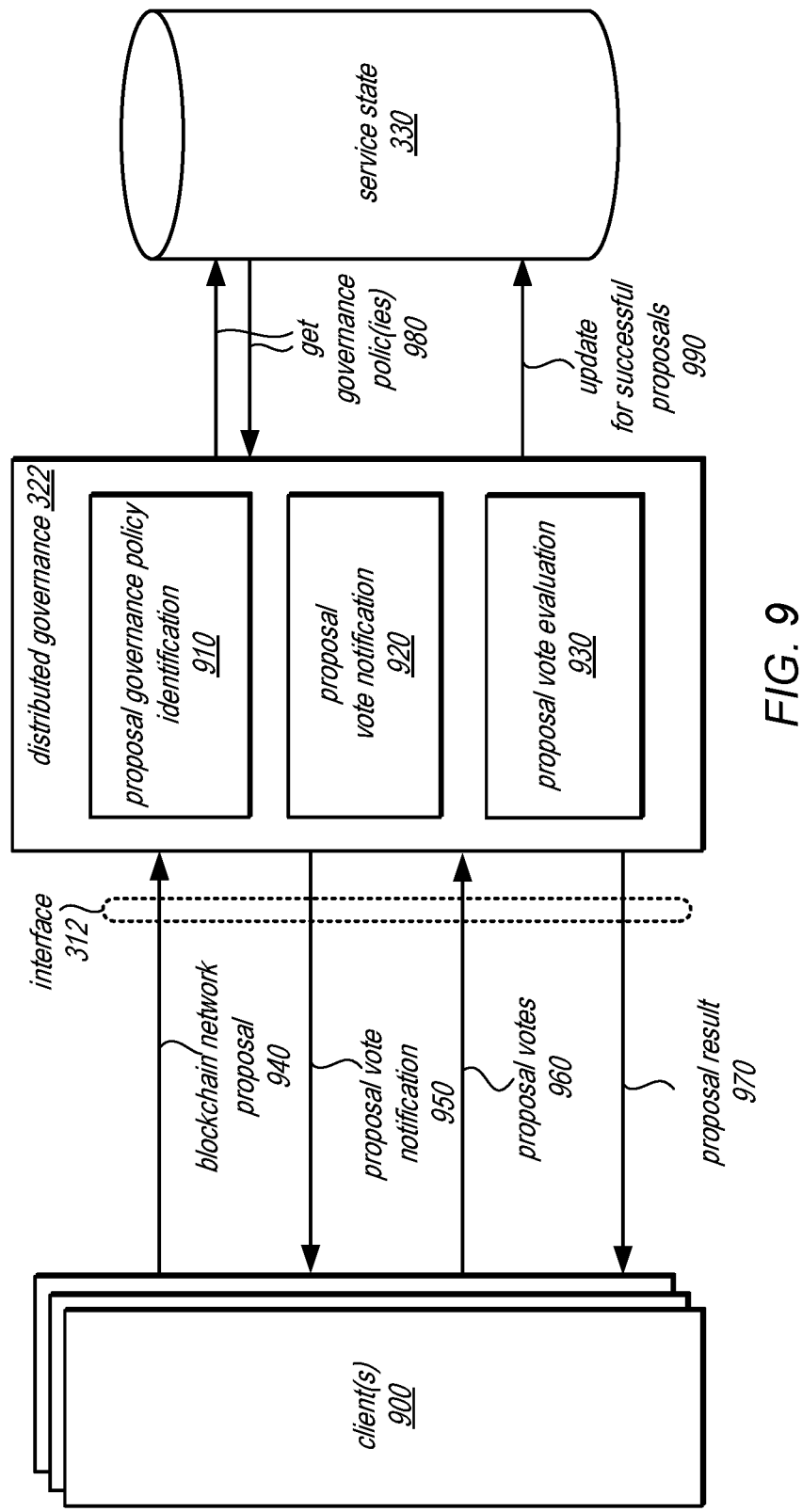
FIG. 9 is logical block diagram illustrating interactions with a distributed governance feature of a control plane of a managed blockchain service, according to some embodiments.

FIG. 9 is logical block diagram illustrating interactions with a distributed governance feature of a control plane of a managed blockchain service, according to some embodiments. Client(s) 900 may be external clients (e.g., 250 in FIG. 2) or internal clients of a provider network 200 that are implemented as applications on other services, such as virtual computing service(s) 210. Client(s) 900 can submit blockchain network proposals 940, such as the various modifications discussed below with regard to FIG. 13, via interface 312 including changes to distributed governance policies. Distributed governance features 322 may implement a proposal governance policy identification 910 in order to determine if a distributed governance policy applies to the proposal as well as what distributed governance policy applies (as more than one may be implemented or created for a blockchain network). For example, proposal governance policy identification 910 may parse the proposal to identify an action, feature, or other modification, and compare the modification with an index of distributed governance policies. If the index returns a match, then the identified policy may be retrieved 980 from service state 330. The proposal governance policy may be applied to the proposal 940. If a vote is required, then proposal vote notification 920 may send one or more proposal vote notifications 950 via interface 312 (e.g., as API messages, console notifications, emails, etc.).

Proposal vote evaluation 930 may then evaluate proposal votes 960 received via interface 312 in order to determine whether the votes satisfy the policy. If so, the proposal may be performed (e.g., by updating service state to reflect the change of the successful proposal 990). In some embodiments, a result 970 may be sent (which may allow another control plane component to proceed with performing a proposed modification, in some embodiments. In some embodiments, distributed governance feature 322 could be implemented as a separate system or service from managed blockchain service 270 (not illustrated) and could handle policy proposal and evaluation features for multiple different services in provider network 200, including managed blockchain service 270.

Figure 10:
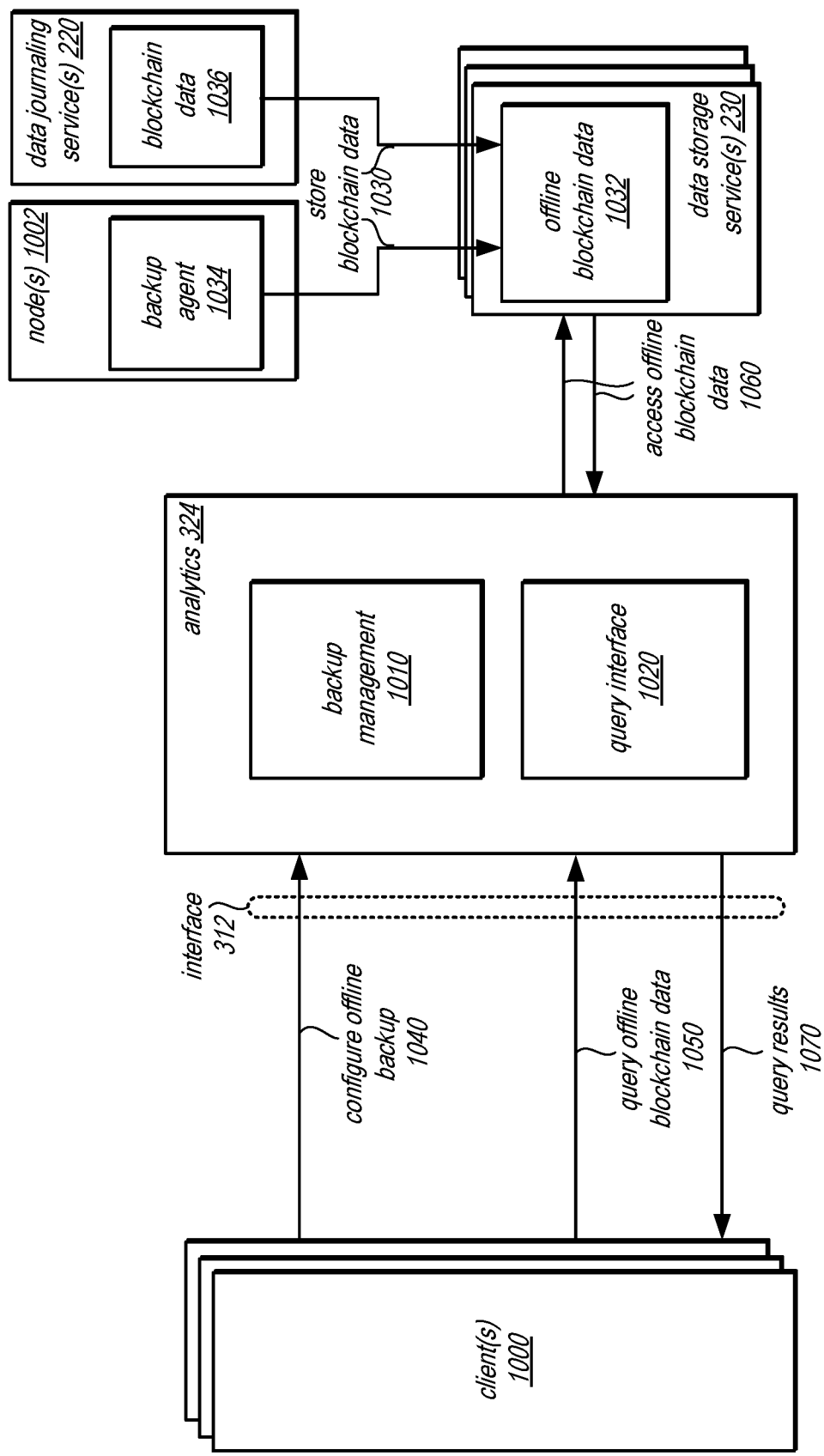
FIG. 10 is a logical block diagram illustrating interactions with an analytics feature of a control plane of a managed blockchain service, according to some embodiments.

FIG. 10 is a logical block diagram illustrating interactions with an analytics feature of a control plane of a managed blockchain service, according to some embodiments. Offline blockchain data 1032 may be collected and stored for a blockchain network, as discussed below with regard to FIG. 14, from different sources, in some embodiments. Depending on the type or framework of blockchain network, a different source for the offline blockchain data may be employed. For instance, a backup agent 1034 may be implemented on peer nodes 1002 in a blockchain network that does not maintain a separate log or ledger of transactions in the blockchain. Instead, backup agent 1034 may periodically (or when node workload is low) store blockchain data 1030 to data storage service(s) 230 in a specified storage location, object, database, etc. For those blockchain networks that do use a separate log or ledger of transactions, like data journaling service(s) 220, some of blockchain data 1036 may be copied or stored 1030 to offline blockchain data 1032 as part of a backup mechanism.

Client(s) 1000 may be external clients (e.g., 250 in FIG. 2) or internal clients of a provider network 200 that are implemented as applications on other services, such as virtual computing service(s) 210. Clients 1000 can submit requests to configure the performance of offline backup 1040 via interface 312. For instance, backup could be enabled or disabled for individual members, nodes, channels, or other portions of a blockchain network. In some embodiments, whether offline backup data is visible to other members may be configured. Analytics feature 324 may implement backup management 1010 to handle configuration requests 1040, and make requested changes, enable or disable backup agents 1034, provision storage space for offline blockchain data 1032 at data storage service(s) 230, among other backup management operations.

Analytics 324 may implement an interface, such as query interface 1020, to handle requests to access offline blockchain data. In some embodiments, data storage service(s) 230 may be a database optimized to handle queries over a log of entries (e.g., a channel or multiple channels of a blockchain stored as part of offline blockchain data 1032). Query interface 1020 may be implemented to handle queries to offline data 1032, like query 1050, and send requests to access offline blockchain data 1060 in order to return a query result 1070, in some embodiments, as discussed below with regard to FIG. 14.

Offline blockchain data 1032 may include the content of transactions in the blockchain, metadata describing blockchain content (e.g., when submitted, who proposed, votes, etc.), or related data (e.g., files or other objects referenced by blockchain content). More generally, in some embodiments, client applications of a blockchain hosted in managed blockchain service 270 may utilize links, references, address, or other information to access data objects stored in other services of provider network 200 (e.g., links to data objects stored in a data storage service 230). In this way, applications that access the data objects linked in the blockchain transactions can be assured that the content has been verified.

Figure 11:
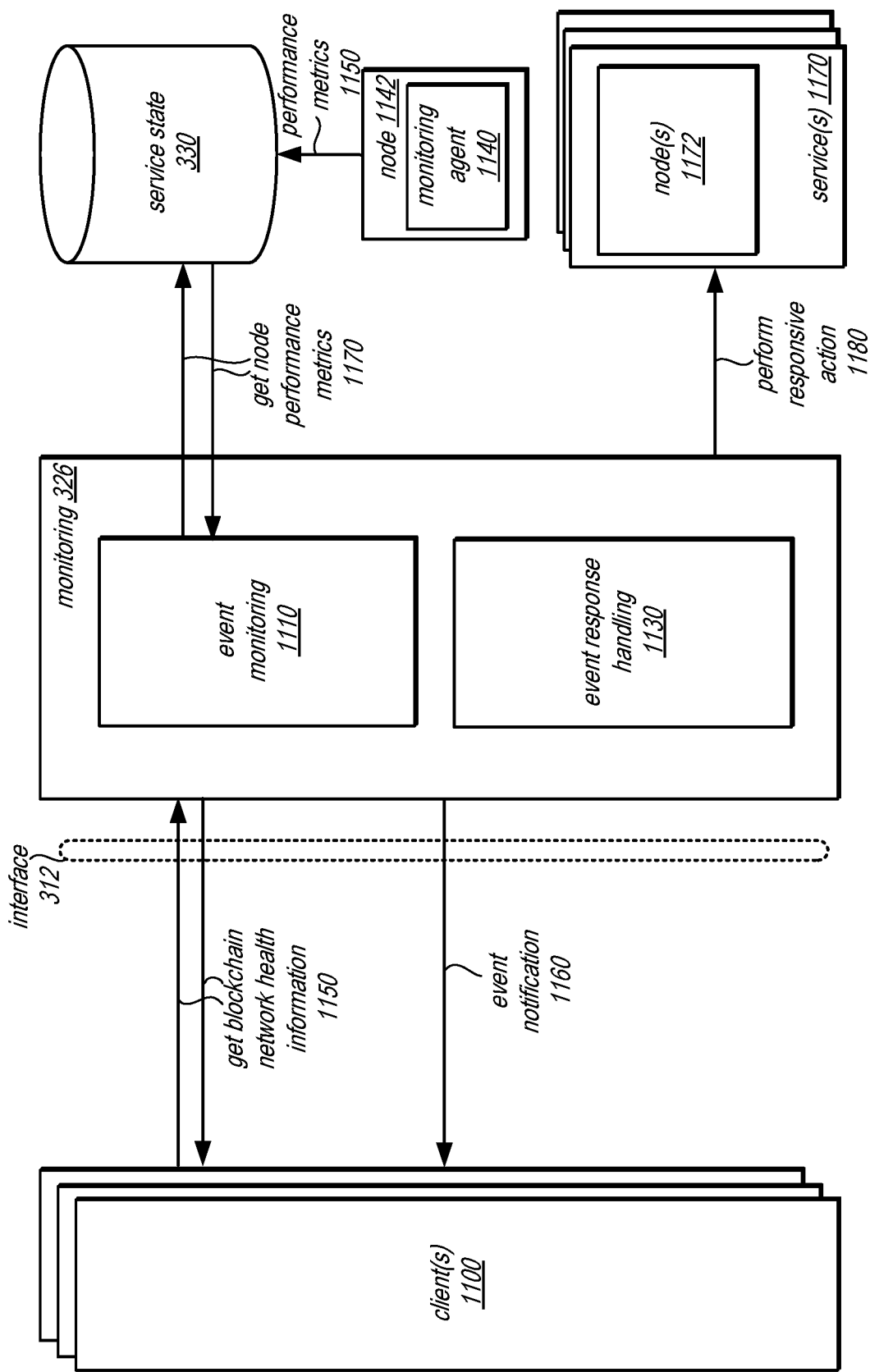
FIG. 11 is a logical block diagram illustrating interactions with a monitoring feature of a control plane of a managed blockchain service, according to some embodiments.

FIG. 11 is a logical block diagram illustrating interactions with a monitoring feature of a control plane of a managed blockchain service, according to some embodiments. Client(s) 1100 may be external clients (e.g., 250 in FIG. 2) or internal clients of a provider network 200 that are implemented as applications on other services, such as virtual computing service(s) 210. Monitoring 326 may handle monitoring-related requests via interface 312. For example, a request to get blockchain network health information 1150 may be received via interface 312. The request may specify a particular member(s), node(s), service(s), or other blockchain network resources, or information for the blockchain network as a whole. Monitoring 326 may enforce some access restrictions (e.g., not allowing performance data for nodes and members not associated with a user account that requested). In other embodiments, there may be no access restrictions to performance data. Monitoring 326 may parse the request and get node performance metrics 1170 from service state 330 in order to answer request 1150.

In some embodiments, monitoring agents 1140 may be implemented on nodes, services, or other blockchain components, like node 1142, in order to collect performance information. The monitoring agent 1140 may push the metrics to service state 330 (or may respond to a request for metrics in a pull-based design).

Monitoring 326 may also performed automated monitoring and management actions in order to manage the operation of a blockchain network on behalf of members so that little or no management directions are required to maintain blockchain network performance. Event monitoring 1110 may get node performance metrics 1170 and evaluate them with respect to one or multiple criteria, as discussed below with regard to FIG. 15. If an event is detected, event monitoring 1110 may signal to event response handling 1130 the event (e.g., according to an event code, location or scope of event (e.g., one node, multiple nodes, entire network etc., and or any other performance metrics of information needed to determine a responsive action. As discussed below with regard to FIG. 15, a responsive action can include an event notification 1160, in some embodiments. Event response handling 1130 may identify or determine one or more responsive actions, as discussed below with regard to FIG. 15, and perform then 1180. For example, services 1170 may host or implement node(s) for a blockchain so that a new node 1172 can be provisioned, configured, and launched to replace a failing node. Transition or other failover operations to transfer data, adjust network endpoints to redirect traffic or other actions to swap nodes may be performed by event response handling 1130.

Figure 12:
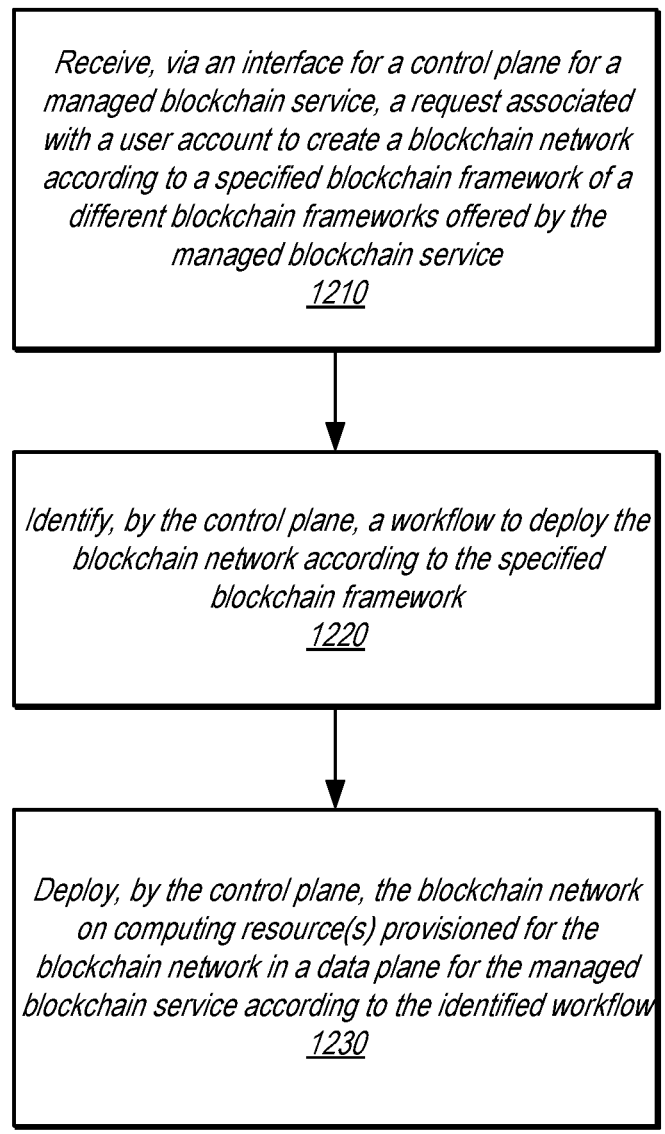
FIG. 12 is a high-level flowchart illustrating various methods and techniques to create a blockchain network in a multi-framework managed blockchain service, according to some embodiments.

As discussed above with regard to FIGS. 2-11, a managed blockchain service may be implemented as part of a provider network. However, a managed blockchain service could be implemented as a standalone service, which may be a publicly available service, or privately implemented. FIG. 12 is a high-level flowchart illustrating various methods and techniques to create a blockchain network in a multi-framework managed blockchain service, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or configurations of systems and devices.

As indicated at 1210, a request associated with a user account of a managed blockchain service may be received via an interface for a control plane of the managed blockchain service to create a blockchain network according to a specified blockchain framework of different blockchain frameworks offered by the managed blockchain service, in some embodiments. For example, a management console may allow a user to specify various features of a blockchain network, such as whether or not the blockchain network will connect to a public network (or be only private), the framework type to be used, name, descriptive information, and a first member, in some embodiments. In at least some embodiments, the request may affirm, select, configure, state, or otherwise specify one (or more) distributed governance policies applicable to govern blockchain network actions subsequent to its creation, as discussed below with regard to FIG. 13.

As indicated at 1220, a workflow to deploy the blockchain network according to the specified blockchain framework may be identified, in some embodiments. For example, a decision tree or other rules-based decision engine may take one or more inputs corresponding to the creation request, including blockchain frame work, for identifying which of multiple different deployment workflows should be used. For example, a private deployment of a permissionless blockchain network may have a different deployment workflow than a public deployment of permissionless blockchain network. In some embodiments, one or multiple sub-workflows may be combined based on the features specified in the creation request (e.g., a network configuration workflow, a blockchain service configuration workflow, a distributed governance policy creation workflow, etc.).

As indicated at 1230, the blockchain network may be deployed by the control plane on computing resource(s) in a data plane for the managed blockchain service according to the identified workflow. For instance, a workflow engine, state machine, or other deployment platform of the control plane may take the workflow and execute, request, instruct, or otherwise cause all of the workflow features to be accomplished. In some embodiments, a control plane agent or host manager implemented on the resources themselves may be instructed to perform some or all of the identified workflow.

Figure 13:
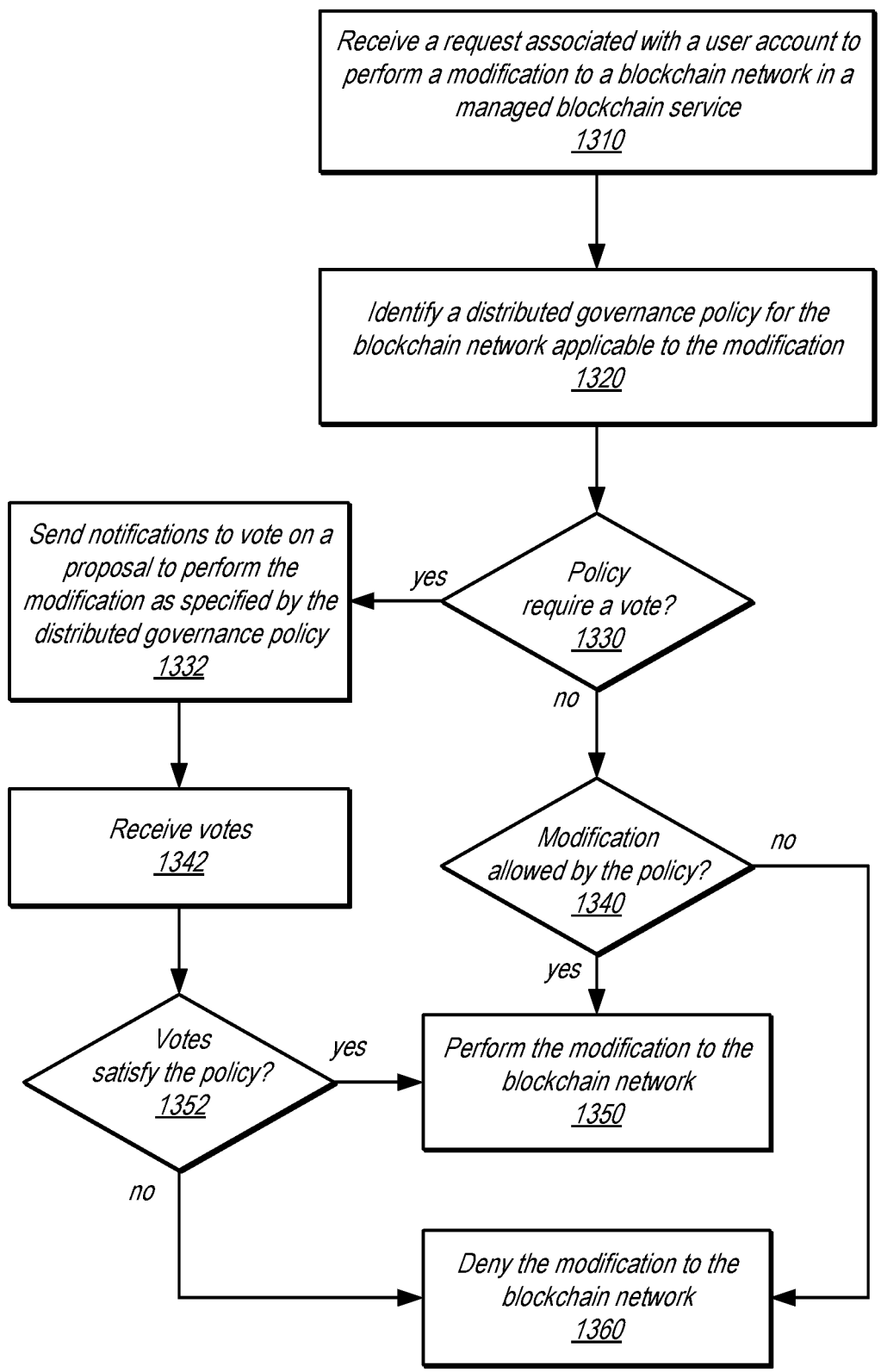
FIG. 13 is a high-level flowchart illustrating various methods and techniques to perform modifications to a blockchain network according to a distributed governance policy, according to some embodiments.

FIG. 13 is a high-level flowchart illustrating various methods and techniques to perform modifications to a blockchain network according to a distributed governance policy, according to some embodiments. As indicated at 1310, a request associated with a user account to perform a modification to a blockchain network in a managed blockchain service may be received. The request, as discussed above may be received via an interface a control plane and may be associated with a user account of the service different than the user account that submitted the request to create the blockchain network. Modification requests could cover any of the changes discussed above with regard to FIGS. 4-11, including changes to membership, governance, hardware or software configuration, backup mechanisms, monitoring and responsive actions, and so on, as well as changes to distributed governance policies. While some actions, like adding and removing nodes could be limited to a single member's discretion, even those actions could in some scenarios be controlled or managed by a distributed governance policy.

As indicated at 1320, a distributed governance policy for the blockchain network in effect and applicable to the modification may be identified, in some embodiments. For example, default policies could be specified to cover multiple different modifications (although in some embodiments some modifications may be covered if an additional distributed governance policy is created). In some embodiments, an identifier or label for a modification may serve as an index to an applicable policy (or none if none is applicable).

As indicated at 1330, a determination may be made as to whether the distributed governance policy requires a vote to proceed. For example, a policy may be stored as a JSON or other text which an enforcement component for the control plane may parse to determine whether criteria to satisfy the policy like voting are used. If yes, then as indicated at 1332, notifications to vote on a proposal to perform the modification as specified by the distributed governance policy may be sent, in some embodiments. For example, the means of notification, the identity of recipients, and other features such as resends, alternates, or other voting notification features may be specified in the distributed governance policy.

The notification may include a link or user interface element, network endpoint, or other feature that indicates how a vote in response to the notification can be cast. In at least some embodiments, the votes may be sent through one or more voting APIs which may allow for client applications to develop custom voting platforms or communications for receiving votes (e.g., a screen share application where the appropriate users can register a vote in a chat channel, an application that blocks further admin access until a vote is performed (to prevent filibusters), etc.). In this way, the voting API may provide greater flexibility then completely integrated voting solutions which only allow for votes to be cast in a particular manner, in some embodiments.

As indicated at 1342, votes may be received. A determination may be made as to whether the votes satisfy the policy, as indicated at 1352. For example, voting criteria including quorum rules, vote margin (e.g., majority, plurality, super majority, etc.), voter rolls (e.g., voters with veto authority), abstentions allowed, etc., can be specified by the governance policy. Changes to governance policy may themselves be submitted as a modification, which may not become affective until satisfying a current governance policy. If the votes satisfy the policy, then the modification may be performed as indicated at 1350. If the votes do not satisfy the policy, then the modification to the blockchain network may be denied, as indicated at 1360.

Some policies may not require a vote, as indicated by the negative exit from 1330. For example, some modifications may be performed at certain times, or within certain parameters. Consider a policy that allows for a member to implement up to a maximum number of nodes without consulting other members. The policy may be evaluated for a modification to add a node, but may not need a vote if it can be satisfied because the added node is still within the maximum number. If the modification is allowed by the policy, as indicated by the positive exit from 1340, then the modification may be performed to the blockchain network. If the modification is not allowed by the policy, then the modification to the blockchain network may be denied, as indicated at 1360.

Figure 14:
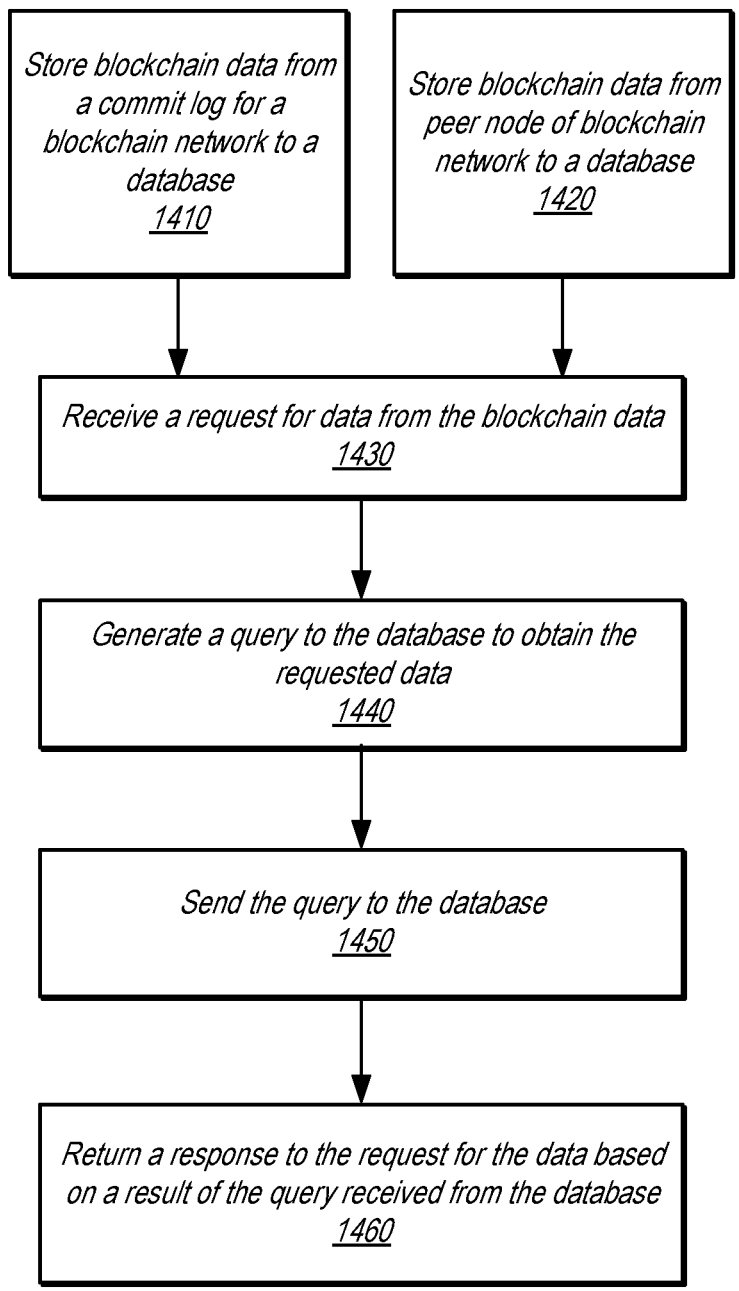
FIG. 14 is a high-level flowchart illustrating various methods and techniques to store and query offline blockchain data, according to some embodiments.

FIG. 14 is a high-level flowchart illustrating various methods and techniques to store and query offline blockchain data, according to some embodiments. As indicated at 1410, blockchain data may be stored from a commit log for a blockchain network to a database, in some embodiments. For example, a backup mechanism for a data journal service discussed above or other ordered commit log services, like Apache's Kafka, may include options or mechanisms store a copy of the transaction log representing a blockchain (or a channel of a blockchain) in a separate storage location, such as a database. Similarly, for those types of blockchain networks that do not utilize a separate commit log (e.g., Ethereum), a backup agent (or other component) on the peer nodes that receive and maintain the blockchain data on node may store the blockchain data from the peer node of the blockchain network to a database, as indicated at 1420.

A managed blockchain service may implement an interface for which to provide access to the offline data stored for the blockchain network. The interface could be an interface that allowed for portions (e.g., files or objects) of blockchain data to be downloaded or viewed. In some embodiments, analytical tools, such as various kinds of statistical analysis and/or machine learning analysis could be implemented to provide views and reports of offline blockchain data. As indicated at 1430, a request for data from the blockchain data may be received, in some embodiments. The request may be formatted according to an API with various feature for identifying the data to return (e.g., by chain, members of the transaction, proposer, approvers, date, time, content of the transaction, etc.). In some embodiments, the interface may allow for query languages (e.g., SQL) to be used.

As indicated at 1440, a query to the database to obtain the requested data may be generated, in some embodiments. For instance, if an API is used, then a query language may be used to translate the API request into the corresponding query language. As indicated at 1450, the query may then be sent to the database, in one embodiments. For example, a database connection between the control plane and the database may be previously established and used to send the query. A result may be received back from the database, including an empty result. As indicated at 1460, a response to the request for the data may be returned based on a result of the query received from the database, in some embodiments. For instance, the format of the results could be modified to fit the API used to submit the request for data and/or to display results (e.g., at a console for the managed blockchain service).

Figure 15:
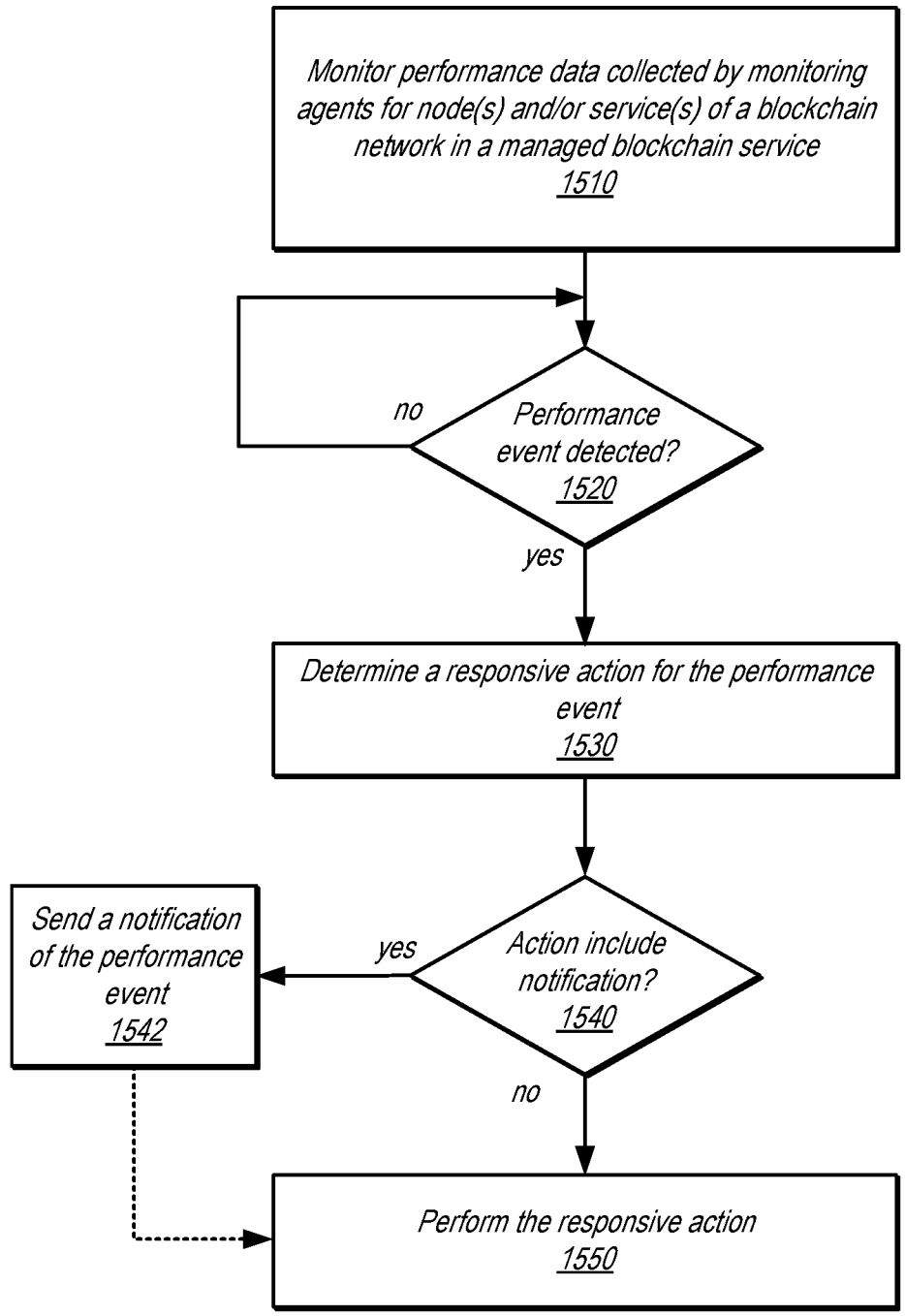
FIG. 15 is a high-level flowchart illustrating various methods and techniques monitor a blockchain network for performance events, according to some embodiments.

FIG. 15 is a high-level flowchart illustrating various methods and techniques monitor a blockchain network for performance events, according to some embodiments. As indicated at 1510, performances data collected by monitoring agents for node(s) and/or service(s) of a blockchain network in a managed blockchain service may be monitored. A control plane, as discussed above with regard to FIG. 11, may operate a central data store of performance data which may be evaluated by one or more monitoring nodes, components, or that read data from the central data store. In some embodiments, the monitoring may be performed by the monitoring agents on the hosts, servers, or systems that implement the node(s) and/or service(s) of the blockchain network.

As indicated at 1520, a determination may be made as to whether a performance event is detected, in some embodiments. Various types of performance events may be monitored for, in some embodiments. For example, capacity or utilization metrics may be collected that indicate use of the processing resources, storage resources, or network resources of the node or service. If the utilization exceeds a threshold (or falls below a threshold), then a corresponding performance event for the resource may be detected (e.g., not enough processor capacity to handle the load on the node or service). Performance data may be a liveness indication, such as a heartbeat message, sent to the monitoring features of the control plane which may detect a failure event (e.g., due to node or network failure) for a node or service that fails to send an indication that the node or service is still alive. In some embodiments, combinations of criteria for different resources may be used to detect a performance event (e.g., if response latency to application requests exceeds a threshold AND network bandwidth consumption exceeds a minimum threshold then a performance event may be detected).

As indicated at 1530, a responsive action may be determined for the performance event, in some embodiments. For example, a mapping between detected events and responsive action(s) may be maintained so that the action appropriate to respond to the detected event is determined. Some responsive actions may include operations to heal, configure, fix, or otherwise improve the performance of a node or service that triggered the performance event (e, move work to another node, adjust resource allocations on the node, change access control parameters for handling network request, etc.) Some responsive actions may include actions to remove or replace a node or service. If, for instance, a node is underutilized, then a responsive action to remove the underutilized node and shift the work to another node may be performed. In some scenarios the node or service may be failing (or have failed), and thus the responsive action may include provisioning, configuring, and starting a new node or service.

As indicated at 1540, in at least some embodiments, the responsive action may include a notification (in addition to other actions, as indicated by the dotted arrow from 1542 to 1550 or instead of another responsive action). If a notification is specified, then a notification of the performance event may be sent, as indicated at 1542. For example, an email notification, text notification via a wireless communication network, a message or notification displayed on a user account console of a provider network, may be examples of the types of notifications provided. Notifications may be sent to entities for nodes host external to provider network 200 that are members of a blockchain network service. Such nodes could still implement a monitoring agent (e.g., provided by provider network 200) to collect information used to detect events so that even if an operation would have to be performed from control tools or apparatus of the external network, a control plane for the managed blockchain service could still be aware of and direct the performance of the appropriate responsive action via the notification.

As indicated at 1550, the responsive action determined at 1530 may be performed, in some embodiments. For example to replace a failing or ailing node or service, one or more requests to launch or provision a new node or service for the blockchain network may be made to those systems or services that host or implement the failing or ailing node or service. In some embodiments, the responsive action may include sending instructions to a monitoring or other control plane agent on a node to perform configuration changes or adjustments to resource allocation at a host device (e.g., at a server).

The methods described herein may in various embodiments be implemented by any combination of hardware and software. For example, in one embodiment, the methods may be implemented by a computer system (e.g., a computer system as in FIG. 16) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 16:
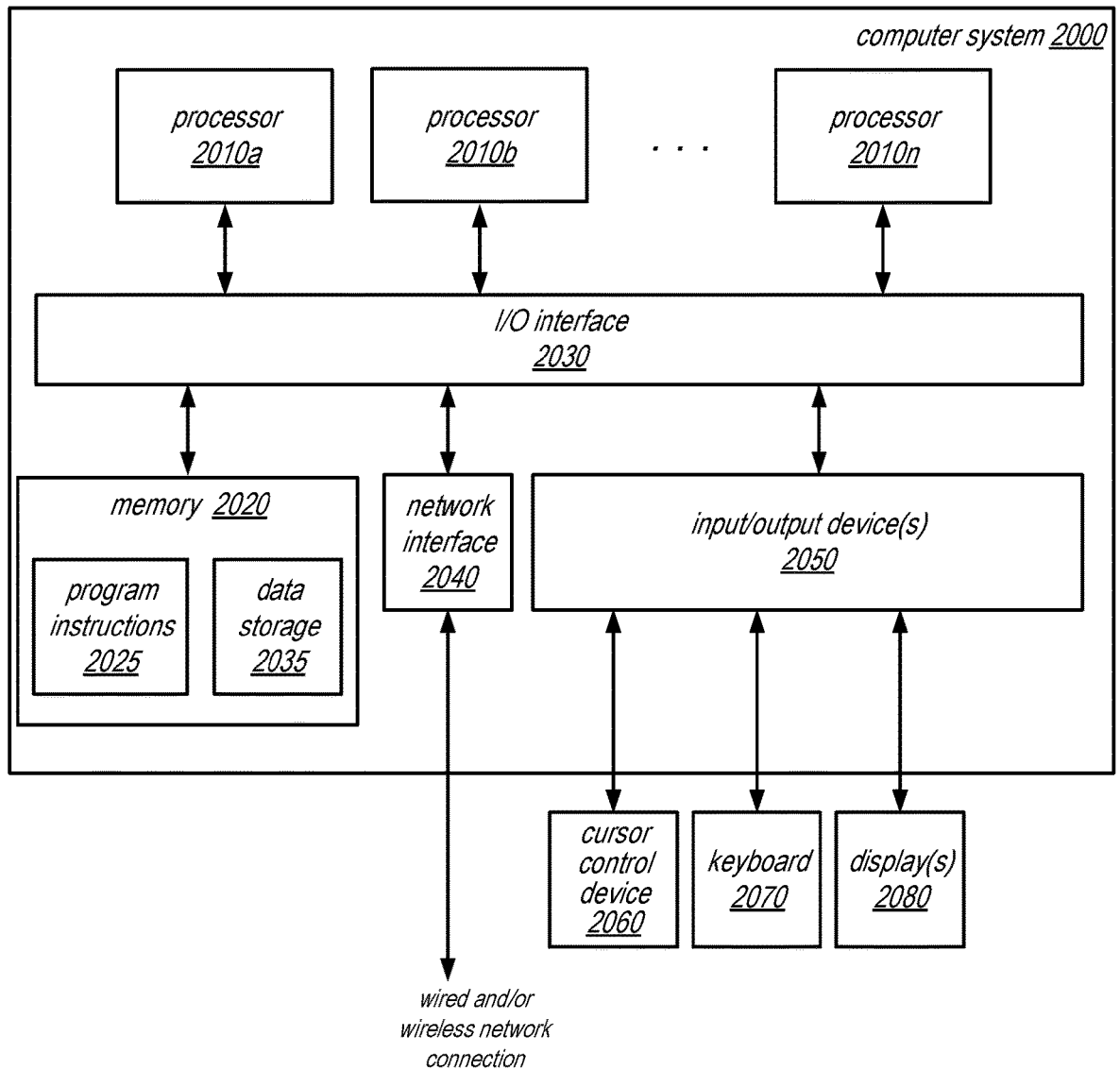
FIG. 16 illustrates an example system configured to implement the various methods, techniques, and systems described herein, according to some embodiments.

Embodiments of multi-framework managed blockchain service as described herein may be executed on one or more computer systems, which may interact with various other devices. One such computer system is illustrated by FIG. 16. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a non-transitory, computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 16, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A managed blockchain service, comprising:
a first plurality of nodes, respectively comprising at least one processor and a memory, that implement a data plane for the managed blockchain service;
a second plurality of nodes, respectively comprising at least one other processor and another memory, that implement a control plane for the managed blockchain service that is separate from the data plane for the managed blockchain service, wherein the control plane is configured to control blockchain networks according to a plurality of different blockchain frameworks with respective distributed governance policies, wherein one of the respective distributed governance policies of one of the blockchain frameworks describes a mechanism for approving modifications received via a control plane interface and performing the modifications by the control plane with respect to a corresponding blockchain network, and wherein the control plane interface for the control plane is separate from performance of transactions between nodes of the corresponding blockchain framework in the data plane;
wherein the control plane is configured to:
receive a request, via the control plain interface, associated with a user account to create a blockchain network according to a specified blockchain framework of the plurality of different blockchain frameworks offered by the managed blockchain service;
identify a workflow to deploy the blockchain network according to the specified blockchain framework;
provision one or more nodes of the data plane that is separate from the control plane for the managed blockchain service to host the blockchain network requested to be created according to the request received by the control plane;
execute the workflow to deploy the blockchain network on the provisioned one or more nodes of the data plane that is separate from the control plane for the managed blockchain service;
receive a request, via the control plain interface, associated with a different user account of the managed blockchain service via the control plane interface to perform a modification to the blockchain network; and
modify the blockchain network in the data plane according to the request after a determination that the modification is allowed by a specified distributed governance policy for the blockchain network according to the specified blockchain framework.

2. The system of claim 1, wherein the control plane is configured to:
send one or more notifications, via the control plain interface, to vote on a proposal to perform the modification according to the distributed governance policy; and
evaluate received votes according to the distributed governance policy to determine that the modification is allowed.

3. The system of claim 1, wherein the control plane is further configured to:
receive a request for data from offline blockchain data stored in a database;
generate a query to the database to obtain the requested data;
send the query to the database; and
return a response to the request for the data based on a result of the query received from the database.

4. The system of claim 3, wherein the managed blockchain service is implemented as part of a provider network, and wherein the data store is a storage service implemented as part of the provider network.

5. A method, comprising:
receiving, via a control plane interface at a control plane for a managed blockchain service, a request associated with a user account to create a blockchain network with a specified distributed governance policy according to a specified blockchain framework of a plurality of different blockchain frameworks offered by the managed blockchain service, wherein the managed blockchain service includes the control plane and a separate data plane that are implemented using respective computing resources, wherein the control plane is configured to control blockchain networks according to the plurality of different blockchain frameworks with respective distributed governance policies, wherein the specified distributed governance policy describes a mechanism for approving modifications received via the control plane interface and performing the modifications by the control plane with respect to the specified distributed governance policy of the blockchain network to be created according to the specified blockchain framework, and wherein the control plane interface for the control plane is separate from performance of transactions between nodes of the specified blockchain framework in the data plane;
deploying, by the control plane, the blockchain network on one or more computing resources provisioned for the blockchain network in the data plane for the managed blockchain service that is separate from the control plane for the managed blockchain service according to a workflow identified for the specified blockchain framework; and
responsive to a request associated with a different user account of the managed blockchain service and received via the control plane interface to perform a modification to the blockchain network, performing, by the control plane, the modification to the blockchain network in the data plane after a determination by the control plane that the modification is allowed by a specified distributed governance policy in effect for the blockchain network according to the specified blockchain framework.

6. The method of claim 5, further responsive to the request to perform the modification:
sending one or more notifications to vote on a proposal to perform the modification according to the distributed governance policy; and
evaluating received votes according to the distributed governance policy to determine that the modification is allowed.

7. The method of claim 5, further comprising:
responsive to another request received via the control plane interface to perform another modification to the blockchain network,
sending, via the control plane interface, one or more notifications to vote on a proposal to perform the modification according to the distributed governance policy;
evaluating received votes according to the distributed governance policy to determine that the modification is not allowed; and
denying the request to perform the other modification.

8. The method of claim 5, further comprising:
receiving, via the control plane interface, a request for data from offline blockchain data stored in a database;
generating, by the control plane, a query to the database to obtain the requested data;
sending, by the control plane, the query to the database; and
returning, by the control plane, a response, via the control plane interface, to the request for the data based on a result of the query received from the database.

9. The method of claim 8, wherein the offline blockchain data was stored in the database from a peer node of the blockchain network.

10. The method of claim 5, further comprising:
monitoring, by the control plane, performance data collected for the blockchain network to detect a performance event for the blockchain network;
responsive to detecting the performance event:
determining, by the control plane, a responsive action to the performance event; and
performing, by the control plane, the responsive action.

11. The method of claim 10, wherein the responsive action replaces a peer node for an organization of the blockchain network.

12. The method of claim 5, wherein the specified blockchain framework is a permissioned blockchain framework.

13. The method of claim 5, wherein the modification to the blockchain system is a request to add a member to the blockchain system.

14. One or more non-transitory, computer-readable storage media, storing program instructions that when executed on or across one or more computing devices cause the one or more computing devices to implement:
receiving, via a control plane interface at a control plane for a managed blockchain service, a request associated with a user account to create a blockchain network according to a specified blockchain framework of a plurality of different blockchain frameworks offered by the managed blockchain service, wherein the managed blockchain service includes the control plane and a separate data plane that are implemented using respective computing resources, wherein the control plane is configured to control blockchain networks according to the plurality of different blockchain frameworks with respective distributed governance policies, and wherein one of the respective distributed governance policy of the specified blockchain framework describes a mechanism for approving modifications received via the control plane interface and performing the modifications by the control plane with respect to the specified distributed governance policy of the blockchain network to be created according to the specified blockchain framework, and wherein the control plane interface for the control plane is separate from performance of transactions between nodes of the specified blockchain framework in the data plane;

identifying, by the control plane, a workflow to deploy the blockchain network according to the specified blockchain framework;

causing, by the control plane, execution of the workflow to deploy the blockchain network on one or more computing resources provisioned for the blockchain network in the data plane for the managed blockchain service that is separate from the control plane for the managed blockchain service; and receiving a request associated with a different user account of the managed blockchain service via the control plane interface to perform a modification to the blockchain network;

causing, by the control plane, the modification to the blockchain network in the data plane according to the request after determining by the control plane that the modification is allowed by a specified distributed governance policy for the blockchain network according to the specified blockchain framework.

15. The one or more non-transitory, computer-readable storage media of claim 14, wherein the one or more non-transitory, computer-readable storage media further comprise program instructions to cause the one or more computing devices to implement:

sending, via the control plane interface, one or more notifications to vote on a proposal to perform the modification according to the distributed governance policy; and evaluating received votes according to the distributed governance policy to determine that the modification is allowed.

16. The one or more non-transitory, computer-readable storage media of claim 15, wherein the one or more non-transitory, computer-readable storage media further comprise program instructions to further cause the one or more computing devices to implement identifying the distributed governance policy as applicable to the modification.

17. The one or more non-transitory, computer-readable storage media of claim 14, wherein the one or more non-transitory, computer-readable storage media further comprise program instructions to further cause the one or more computing devices to implement:

receiving, via the control plane interface, a request for data from offline blockchain data stored in a database;

generating, by the control plane, a query to the database to obtain the requested data;

sending, by the control plane, the query to the database; and returning, via the control plane interface, a response to the request for the data based on a result of the query received from the database.

18. The one or more non-transitory, computer-readable storage media of claim 14, causing blockchain data from the blockchain network to be stored in a separate data store.

19. The one or more non-transitory, computer-readable storage media of claim 14, wherein the one or more non-transitory, computer-readable storage media further comprise program instructions to further cause the one or more computing devices to implement:

monitoring, by the control plane, performance data collected for the blockchain network to detect a performance event for the blockchain network;

responsive to detecting the performance event:
determining, by the control plane, a responsive action to the performance event; and
performing, by the control plane, the responsive action.

20. The one or more non-transitory, computer-readable storage media of claim 14, wherein the specified blockchain framework is a permissionless blockchain framework.

* * * * *